(12) United States Patent
McCorkle

(10) Patent No.: US 8,451,936 B2
(45) Date of Patent: *May 28, 2013

(54) METHOD AND SYSTEM FOR PERFORMING DISTANCE MEASURING AND DIRECTION FINDING USING ULTRAWIDE BANDWIDTH TRANSMISSIONS

(75) Inventor: John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 514 days.

This patent is subject to a terminal disclaimer.

(21) Appl. No.: 12/588,627

(22) Filed: Oct. 22, 2009

(65) Prior Publication Data

US 2010/0046586 A1     Feb. 25, 2010

Related U.S. Application Data

(63) Continuation of application No. 12/068,676, filed on Feb. 11, 2008, now Pat. No. 7,616,676.

(51) Int. Cl.
*H04L 27/00*     (2006.01)

(52) U.S. Cl.
USPC ........... 375/295; 375/146; 375/147; 375/219; 375/316

(58) Field of Classification Search
USPC .......................... 375/146, 147, 219, 295, 316
See application file for complete search history.

(56) References Cited

U.S. PATENT DOCUMENTS

| | | | |
|---|---|---|---|
| 2,671,896 A | 3/1954 | De Rosa | |
| 2,999,128 A | 9/1961 | Hoeppner | |
| 3,409,744 A | 11/1968 | Liberman | |
| 3,587,107 A | 6/1971 | Ross | |
| 3,612,899 A | 10/1971 | Ross | |
| 3,659,203 A | 4/1972 | Ross et al. | |
| 3,662,316 A | 5/1972 | Robbins | |
| 3,668,639 A | 6/1972 | Harmuth | |
| 3,678,204 A | 7/1972 | Harmuth | |
| 3,705,981 A | 12/1972 | Harmuth | |
| 3,728,632 A | 4/1973 | Ross | |
| 3,739,392 A | 6/1973 | Ross et al. | |
| 3,772,697 A | 11/1973 | Ross | |
| 3,794,996 A | 2/1974 | Robbins et al. | |

(Continued)

FOREIGN PATENT DOCUMENTS

| | | |
|---|---|---|
| EP | 0 676 650 | 10/1995 |
| EP | 0 776 106 A | 5/1997 |

(Continued)

OTHER PUBLICATIONS

U.S. Appl. No. 60/207,225, filed May 26, 2000, McCorkle.

(Continued)

*Primary Examiner* — Ted Wang

(57) ABSTRACT

A method is provided for enabling a device function at a local device based on distance information, comprising: establishing a communication link with a remote device over a UWB medium using a multiple access protocol; determining a distance between the local device and the remote device; and controlling a device function for the remote device based on the determined distance, wherein the operation of controlling the device function enables the device function when the determined distance is below a set distance threshold, and wherein the operation of controlling the device function disables the device function when the determined distance is above the set distance threshold.

17 Claims, 22 Drawing Sheets

U.S. PATENT DOCUMENTS

| | | |
|---|---|---|
| 3,806,795 A | 4/1974 | Morey |
| 3,878,749 A | 4/1975 | Woron |
| 3,934,252 A | 1/1976 | Ross et al. |
| 3,995,212 A | 11/1976 | Ross |
| 4,017,854 A | 4/1977 | Ross |
| 4,072,942 A | 2/1978 | Alongi |
| 4,099,118 A | 7/1978 | Franklin et al. |
| 4,152,701 A | 5/1979 | Mara et al. |
| 4,254,418 A | 3/1981 | Cronson et al. |
| 4,344,705 A | 8/1982 | Kompa et al. |
| 4,473,906 A | 9/1984 | Warnaka et al. |
| 4,506,267 A | 3/1985 | Harmuth |
| 4,641,317 A | 2/1987 | Fullerton |
| 4,651,152 A | 3/1987 | Harmuth |
| 4,688,041 A | 8/1987 | Cronson et al. |
| 4,689,806 A | 8/1987 | Von der Embse |
| 4,695,752 A | 9/1987 | Ross et al. |
| 4,698,633 A | 10/1987 | Lamensdorf et al. |
| 4,743,906 A | 5/1988 | Fullerton |
| 4,751,515 A | 6/1988 | Corum |
| 4,813,057 A | 3/1989 | Fullerton |
| 4,862,174 A | 8/1989 | Natio et al. |
| 4,907,001 A | 3/1990 | Harmuth |
| 4,979,186 A | 12/1990 | Fullerton |
| 5,007,068 A | 4/1991 | Simon et al. |
| 5,057,846 A | 10/1991 | Harmuth |
| 5,090,024 A | 2/1992 | Vender Mey et al. |
| 5,095,312 A | 3/1992 | Jehle et al. |
| 5,134,408 A | 7/1992 | Harmuth |
| 5,146,616 A | 9/1992 | Tang et al. |
| 5,148,174 A | 9/1992 | Harmuth |
| 5,151,702 A | 9/1992 | Urkowitz |
| 5,153,595 A | 10/1992 | Harmuth |
| 5,159,343 A | 10/1992 | Harmuth |
| 5,177,486 A | 1/1993 | Kim et al. |
| 5,184,139 A | 2/1993 | Hirako et al. |
| 5,216,429 A | 6/1993 | Nakagawa et al. |
| 5,216,695 A | 6/1993 | Ross et al. |
| 5,223,838 A | 6/1993 | Tang et al. |
| 5,227,621 A | 7/1993 | Kim et al. |
| 5,237,586 A | 8/1993 | Bottomley |
| 5,239,309 A | 8/1993 | Tang et al. |
| 5,239,497 A | 8/1993 | McKay et al. |
| 5,248,975 A | 9/1993 | Schutz |
| 5,274,271 A | 12/1993 | McEwan |
| 5,307,079 A | 4/1994 | Ross et al. |
| 5,307,081 A | 4/1994 | Harmuth |
| 5,313,056 A | 5/1994 | Kim et al. |
| 5,319,218 A | 6/1994 | Kim et al. |
| 5,323,169 A | 6/1994 | Koslover |
| 5,332,938 A | 7/1994 | McEwan |
| 5,337,054 A | 8/1994 | Ross et al. |
| 5,345,471 A | 9/1994 | McEwan |
| 5,351,053 A | 9/1994 | Wicks et al. |
| 5,352,974 A | 10/1994 | Heger |
| 5,353,301 A | 10/1994 | Mitzlaff |
| 5,359,624 A | 10/1994 | Lee et al. |
| 5,361,070 A | 11/1994 | McEwan |
| 5,363,108 A | 11/1994 | Fullerton |
| 5,365,240 A | 11/1994 | Harmuth |
| 5,377,225 A | 12/1994 | Davis |
| 5,381,151 A | 1/1995 | Boles et al. |
| 5,389,939 A | 2/1995 | Tang et al. |
| 5,422,607 A | 6/1995 | McEwan |
| 5,426,618 A | 6/1995 | Chen et al. |
| 5,449,894 A | 9/1995 | Bruhnke et al. |
| 5,455,593 A | 10/1995 | Ross |
| 5,457,394 A | 10/1995 | McEwan |
| 5,465,094 A | 11/1995 | McEwan |
| 5,469,471 A | 11/1995 | Wheatley, III |
| 5,471,162 A | 11/1995 | McEwan |
| 5,471,508 A | 11/1995 | Koslov |
| 5,479,120 A | 12/1995 | McEwan |
| 5,486,833 A | 1/1996 | Barrett |
| 5,493,691 A | 2/1996 | Barrett |
| 5,495,499 A | 2/1996 | Fenton et al. |
| 5,510,800 A | 4/1996 | McEwan |
| 5,512,834 A | 4/1996 | McEwan |
| 5,517,198 A | 5/1996 | McEwan |
| 5,519,342 A | 5/1996 | McEwan |
| 5,519,400 A | 5/1996 | McEwan |
| 5,521,600 A | 5/1996 | McEwan |
| 5,523,758 A | 6/1996 | Harmuth |
| 5,523,760 A | 6/1996 | McEwan |
| 5,525,907 A | 6/1996 | Frazier |
| 5,526,299 A | 6/1996 | Coifman et al. |
| 5,533,046 A | 7/1996 | Lund |
| 5,543,799 A | 8/1996 | Heger |
| 5,563,605 A | 10/1996 | McEwan |
| 5,568,522 A | 10/1996 | Hershey et al. |
| 5,573,012 A | 11/1996 | McEwan |
| 5,576,627 A | 11/1996 | McEwan |
| 5,581,256 A | 12/1996 | McEwan |
| 5,583,819 A | 12/1996 | Roesner et al. |
| 5,583,892 A | 12/1996 | Drakul et al. |
| 5,586,145 A | 12/1996 | Morgan et al. |
| 5,589,838 A | 12/1996 | McEwan |
| 5,592,177 A | 1/1997 | Barrett |
| 5,594,456 A | 1/1997 | Norris et al. |
| 5,596,601 A | 1/1997 | Bar-David |
| 5,602,964 A | 2/1997 | Barrett |
| 5,609,059 A | 3/1997 | McEwan |
| 5,610,611 A | 3/1997 | McEwan |
| 5,610,907 A | 3/1997 | Barrett |
| 5,623,511 A | 4/1997 | Bar-David et al. |
| 5,627,856 A | 5/1997 | Durrant et al. |
| 5,630,216 A | 5/1997 | McEwan |
| 5,633,889 A | 5/1997 | Schilling |
| 5,640,419 A | 6/1997 | Janusas |
| 5,642,377 A | 6/1997 | Chung et al. |
| 5,648,787 A | 7/1997 | Ogot et al. |
| 5,654,978 A | 8/1997 | Vanderpool et al. |
| 5,659,572 A | 8/1997 | Schilling |
| 5,661,385 A | 8/1997 | McEwan |
| 5,661,490 A | 8/1997 | McEwan |
| 5,673,050 A | 9/1997 | Moussally et al. |
| 5,673,286 A | 9/1997 | Lomp |
| 5,677,927 A | 10/1997 | Fullerton et al. |
| 5,682,164 A | 10/1997 | McEwan |
| 5,687,169 A | 11/1997 | Fullerton |
| 5,748,891 A | 5/1998 | Fleming et al. |
| 5,804,921 A | 9/1998 | McEwan et al. |
| 5,832,035 A | 11/1998 | Fullerton |
| 5,838,074 A | 11/1998 | Loeffler et al. |
| 5,850,449 A | 12/1998 | McManis |
| 5,878,034 A | 3/1999 | Hershey et al. |
| 5,898,665 A | 4/1999 | Sawahashi et al. |
| 5,901,172 A | 5/1999 | Fontana et al. |
| 5,930,304 A | 7/1999 | Hollenbeck et al. |
| 5,945,920 A | 8/1999 | Maletsky |
| 5,949,823 A | 9/1999 | Suga et al. |
| 5,956,624 A | 9/1999 | Hunsinger et al. |
| 5,960,031 A | 9/1999 | Fullerton et al. |
| 5,963,581 A | 10/1999 | Fullerton et al. |
| 5,995,534 A | 11/1999 | Fullerton et al. |
| 6,003,092 A | 12/1999 | Waters |
| 6,011,974 A | 1/2000 | Cedervall et al. |
| 6,026,125 A | 2/2000 | Larrick, Jr. et al. |
| 6,031,862 A | 2/2000 | Fullerton et al. |
| 6,115,409 A | 9/2000 | Upadhyay et al. |
| 6,133,876 A | 10/2000 | Fullerton et al. |
| 6,177,861 B1 | 1/2001 | MacLellan et al. |
| 6,195,705 B1 | 2/2001 | Leung |
| 6,205,189 B1 | 3/2001 | Ha |
| 6,340,947 B1 | 1/2002 | Chang et al. |
| 6,351,246 B1 | 2/2002 | McCorkle |
| 6,381,464 B1 | 4/2002 | Vannucci |
| 6,490,456 B1 | 12/2002 | Bogdan et al. |
| 6,505,032 B1 | 1/2003 | McCorkle |
| 6,515,622 B1 | 2/2003 | Izadpanah et al. |
| 6,525,362 B2 | 2/2003 | Sadayuki |
| 6,593,845 B1 | 7/2003 | Friedman et al. |
| 6,597,727 B2 | 7/2003 | Philips et al. |
| 6,625,229 B2 | 9/2003 | Dress, Jr. et al. |
| 6,700,939 B1 | 3/2004 | McCorkle et al. |
| 6,735,238 B1 | 5/2004 | McCorkle |
| 6,809,952 B2 | 10/2004 | Masui |

| | | |
|---|---|---|
| 6,834,073 B1 | 12/2004 | Miller et al. |
| 6,842,493 B2 | 1/2005 | Blatz et al. |
| 6,859,506 B1 | 2/2005 | McCorkle |
| 6,925,108 B1 | 8/2005 | Miller et al. |
| 6,937,646 B1 | 8/2005 | McCorkle |
| 6,965,630 B1 | 11/2005 | Miller et al. |
| 6,967,993 B1 | 11/2005 | Miller |
| 6,972,662 B1 | 12/2005 | Ohkawa et al. |
| 6,975,665 B1 | 12/2005 | McCorkle |
| 7,006,553 B1 | 2/2006 | McCorkle |
| 7,010,056 B1 | 3/2006 | McCorkle et al. |
| 7,058,414 B1 * | 6/2006 | Rofheart et al. .......... 455/456.4 |
| 7,079,604 B1 | 7/2006 | Miller et al. |
| 7,236,742 B2 | 6/2007 | Hall et al. |
| 7,574,219 B2 * | 8/2009 | Rofheart et al. .......... 455/456.1 |
| 2001/0035837 A1 | 11/2001 | Fullerton et al. |
| 2001/0048382 A1 | 12/2001 | Low et al. |
| 2004/0108954 A1 | 6/2004 | Richley et al. |
| 2004/0113783 A1 | 6/2004 | Yagesh |

FOREIGN PATENT DOCUMENTS

| | | |
|---|---|---|
| WO | WO 00/04677 | 1/2000 |
| WO | WO 01/73965 | 10/2001 |
| WO | WO 02/32066 A | 4/2002 |

OTHER PUBLICATIONS

U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle.
"Energy Capture vs. Correlator Resources in Ultra-Wide Bandwidth Indoor Wireless Communications Channels", by Moe Z. Win and Robert A. Scholtz, IEEE, Jun. 1997, pp. 1277-1281.
"Ultra-Wide Bandwidth Time-Hopping Spread-Spectrum Impulse Radio for Wireless Multiple-Access Communications", by Moe Z. Win and Robert A. Scholtz, IEEE Transactions on Communications, vol. 48, No. 4, Apr. 2000, pp. 679-691.
Low-Power, Miniature, Distributed Position Location and Communication Devices Using Ultra-Wideband, Nonsinusoidal Communication Technology, Advanced Research Projects Agency/Federal Bureau of Investigation, Jul. 1995, pp. 1-40.
McEwan et al, "World's Fastest Solid-State Digitizer", Energy & Technology Review, Apr. 1994, p. 1-6.
"Radar Technology May Hold Improved Automobile Safety", Tuesday's Newsline, Mar. 29, 1994, vol. 19, No. 22.
Single-Shot Transient Digitizer (1993), Inventor: Thomas McEwan Motion Detector Technology, Inventor: Thomas McEwan.
Sandeep et al., "Timing Acquisition in Ultra-Wideband=d Communication Systems," IEEE, pp. 1570-1583, 2005.
R. Comerford, "Handhelds Duke It Out for the Internet", IEEE Spectrum, Wireless Internet, pp. 35-41, Aug. 2000.
G.A. Stobbs, et al., "Patenting Propagated Data Signals: What Hath God Wrought?", IEEE Communications Magazine, Patent and Telecommunications, pp. 98-101, Jul. 2000.

* cited by examiner

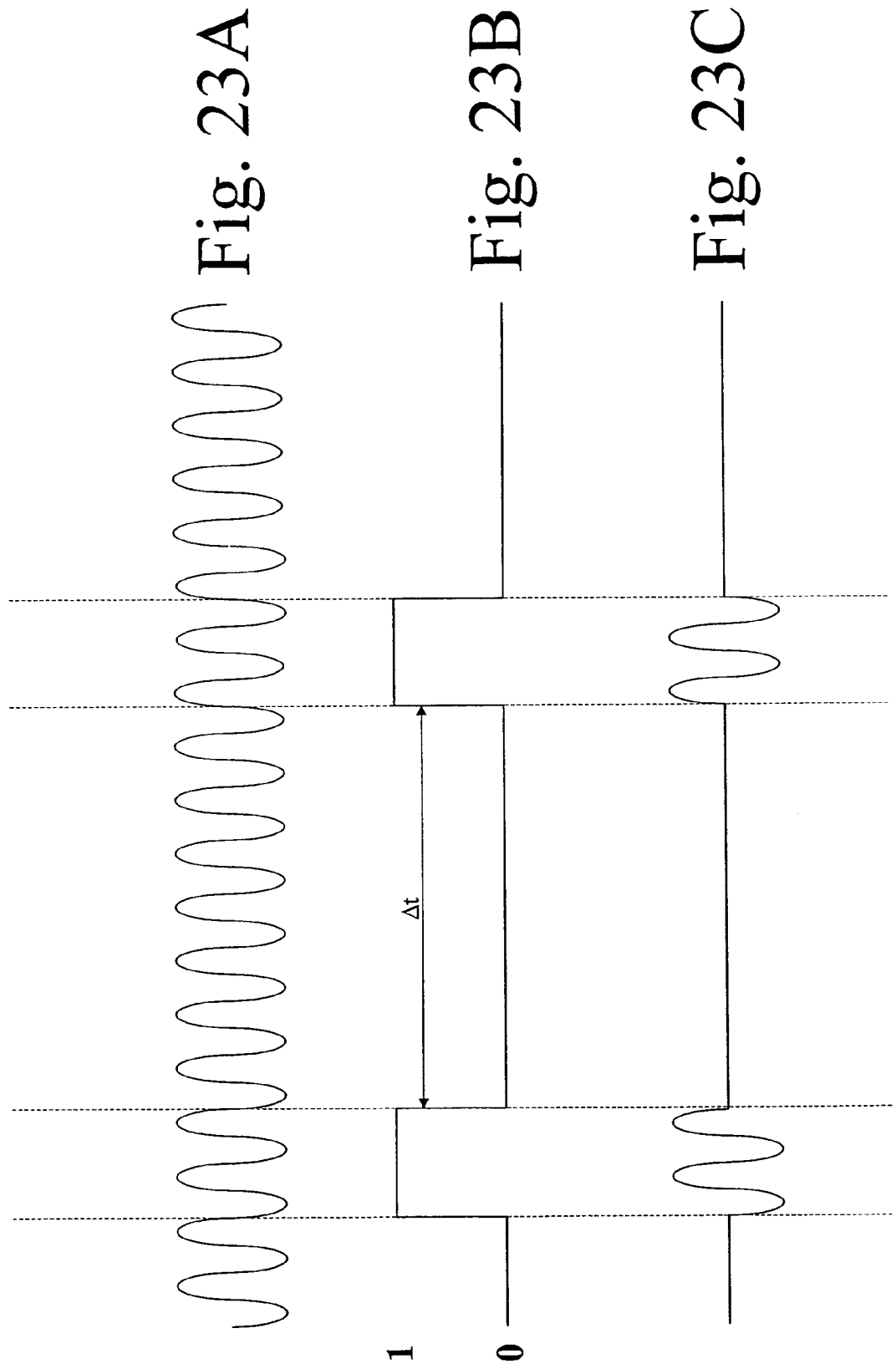

METHOD AND SYSTEM FOR PERFORMING DISTANCE MEASURING AND DIRECTION FINDING USING ULTRAWIDE BANDWIDTH TRANSMISSIONS

CROSS-REFERENCE TO RELATED PATENT DOCUMENTS

This application is a continuation of application Ser. No. 12/068,676 filed Feb. 11, 2008, entitled "METHOD AND SYSTEM FOR PERFORMING DISTANCE MEASURING AND DIRECTION FINDING USING ULTRAWIDE BANDWIDTH TRANSMISSIONS", which is a continuation of application Ser. No. 10/318,371 filed Dec. 13, 2002, entitled "METHOD AND SYSTEM FOR PERFORMING DISTANCE MEASURING AND DIRECTION FINDING USING ULTRAWIDE BANDWIDTH TRANSMISSIONS", which is a continuation-in-part of U.S. application Ser. Nos. 09/209,460, for "ULTRA WIDE BANDWIDTH SPREAD-SPECTRUM COMMUNICATION," filed Dec. 11, 1998; 09/685,202, for "METHOD AND SYSTEM FOR ENABLING DEVICE FUNCTIONS BASED ON DISTANCE INFORMATION," filed Oct. 10, 2000; and 10/214,183, for "MODE CONTROLLER FOR SIGNAL ACQUISITION AND TRACKING IN AN ULTRA WIDEBAND COMMUNICATION SYTEM", filed Aug. 8, 2002, all of which are incorporated by reference in their entirety. Through application Ser. No. 10/318,371 filed Dec. 13, 2002, this application relies for priority on U.S. provisional application No. 60/339,372, for "METHOD AND SYSTEM FOR PERFORMING DISTANCE MEASURING AND DIRECTION FINDING USING ULTRAWIDE BANDWIDTH TRANSMISSIONS," filed Dec. 13, 2001, which is incorporated by reference in its entirety.

BACKGROUND OF THE INVENTION

The present invention relates to radio frequency (RF) communication receivers, systems and methods employing ultra wide bandwidth (UWB) signaling techniques. More particularly, the present invention relates to the systems and methods that use UWB transmissions to track the movement of remote devices by determining those devices' movement, direction, and distance with respect to a central device. Even more particularly, the present invention relates to systems and methods that use both RF transmissions and UWB transmissions in the same device.

It is desirable in many environments to be able to monitor the location or movement of a remote device from a fixed local device. For example, retail stores may wish to monitor their merchandise; warehouses or cargo transports may wish to keep closer track of the cargo that they handle; and internal communications networks may wish to keep track of what users are in which location. Thus, a variety of devices have been used to determine location and distance.

An example of such a device is an RF identity tag, e.g., as described in U.S. Pat. No. 5,995,006, to Walsh, U.S. Pat. No. 6,107,910, to Nysen, or devices of a similar design. Such an RF identity tag has RF circuitry that can detect RF signals transmitted by a local device (whether fixed or mobile) and can then reply with an RF signal of its own to send information back to the local device. The RF signal in this case is a data signal modulated by being impressed upon another RF carrier signal.

The present inventors have also presented a system and method for using UWB signals to achieve similar functions, as set forth in U.S. patent Ser. No. 09/685,202, for "METHOD AND SYSTEM FOR ENABLING DEVICE FUNCTIONS BASED ON DISTANCE INFORMATION," filed Oct. 10, 2000. The UWB signal in this case is preferably one that approximately matches its bandwidth to its center frequency, as defined below.

One important aspect of remote devices such as these is their useful lifetime. If a receiver is used in a remote device, the device may have a limited power supply, e.g., a battery. In this case, it is desirable to minimize the use of the power source so as to extend its usable lifetime.

Some RF tags operate without a separate power supply. Instead they use the RF signal they receive to power themselves up and perform their desired function, e.g., having the incoming RF signal charge a capacitor. This is not possible with current UWB designs. While UWB transceivers may use low amounts of power they cannot use a power source capacitively charged by an incoming RF signal. However, the UWB tags proposed by the current inventors offer better reliability in cluttered environment, as well as other significant advantages.

It would therefore be desirable to provide a system that includes the advantages of both designs, while limiting their limitations.

SUMMARY OF THE INVENTION

Consistent with the title of this section, only a brief description of selected features of the present invention is now presented. A more complete description of the present invention is the subject of this entire document.

An object of the present invention is to provide a remote device that can receive information from a local device and perform a desired function in response, e.g., sending a return signal with a maximum reliability and a minimum use of power.

Another object of the present invention is to maximize the coordination of RF and UWB elements used in a single remote device.

Another feature of the present invention is to address the above-identified and other deficiencies of conventional communications systems and methods.

These and other objects are accomplished by way of a remote device configured to receive both RF and UWB transmissions. While several embodiments are disclosed herein, one embodiment would be to include RF circuitry to receive an RF signal, UWB circuitry to transmit a UWB signal, and a UWB-RF interface to facilitate communication between these two elements.

In an effort to achieve these goals a combined ultrawide bandwidth-radio frequency (UWB-RF) remote identification tag is provided, which comprises: ultrawide bandwidth (UWB) circuitry for receiving or transmitting UWB signals; radio frequency (RF) circuitry for receiving or transmitting RF signals; and interface circuitry formed between the RF circuitry and the UWB circuitry.

This combined UWB-RF remote identification tag may further comprise: a power supply for providing power to the UWB circuitry; and a switch connected between the power supply and the UWB circuitry. The interface circuitry preferably controls the operation of the switch based on a signal received from the RF circuitry.

The UWB-RF interface may further comprise a first scaler for receiving a frequency signal from the RF circuitry, scaling it by a first scaling factor N/M, and providing a first scaled frequency to the UWB circuitry. In this case N and M are preferably integers.

The combined UWB-RF remote identification tag may further comprise: a power supply for providing power to the UWB circuitry; and a switch connected between the power supply and the UWB circuitry. The interface circuitry preferably controls the operation of the switch based on a signal received from the RF circuitry. The scaled frequency is preferably used by the UWB circuitry as a pulse repetition frequency.

The UWB-RF interface may further comprise: a second scaler for receiving the frequency signal from the RF circuitry, scaling it by a second scaling factor P/Q, and providing a second scaled frequency to the UWB circuitry; a memory device for providing a data signal; and a mixer for mixing the second scaled frequency with the data signal to form a UWB radio frequency signal. In this design P and Q are preferably integers.

The UWB-RF interface may further comprise all of: a first scaler for receiving a frequency signal from the RF circuitry, scaling it by a first scaling factor N/M, and providing a first scaled frequency to the UWB circuitry; a second scaler for receiving the frequency signal from the RF circuitry, scaling it by a second scaling factor P/Q, and providing a second scaled frequency to the UWB circuitry; a memory device for providing a data signal; and a mixer for mixing the second scaled frequency with the data signal to form a UWB radio frequency signal, and providing the UWB radio frequency signal to the UWB circuitry. In this design N, M, P and Q are all preferably integers.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIGS. 23A to 23C are signal graphs showing an embodiment in which pulse position modulation (PPM) is used to make a UWB signal coherent with an RF signal.

DETAILED DESCRIPTION OF THE PREFERRED EMBODIMENTS

Figure 1:
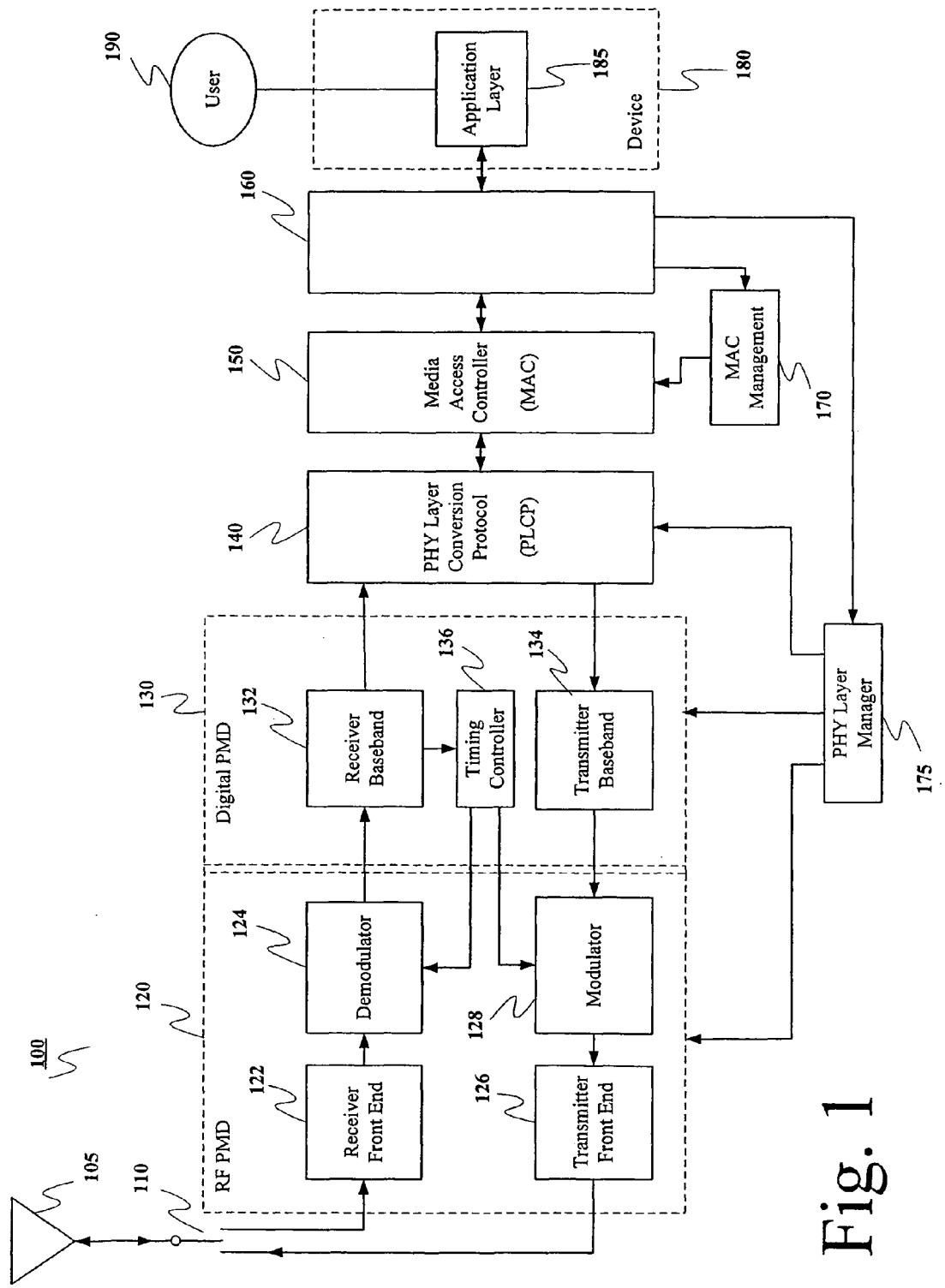
FIG. 1 is a block diagram of an ultra-wide band (UWB) system according to a preferred embodiment of the present invention.

Preferred embodiments of the present invention will now be described with reference to the drawings. Throughout the several views, like reference numerals designate identical or corresponding parts.

FIG. 1 is a block diagram of an ultra-wide band (UWB) system according to a preferred embodiment of the present invention. As shown in FIG. 1, the UWB system 100 includes an antenna 105, a switch 110, an RF physical medium device (PMD) 120, a digital PMD 130, a physical (PHY) layer conversion protocol (PLCP) 140, a media access controller (MAC) 150, a host controller 160, a MAC manager 170, a PHY layer manager 175, and an electronic device 180. The RF PMD 120 further includes a receiver front end 122, a demodulator 124, a transmitter front end 126, and a modulator 128, while the digital PMD 130 further includes a receiver baseband 132, a transmitter baseband 134, and a timing controller 136. The device 180 may include an application layer 185 that allows the device to operate in connection with the host controller 160 and a user 190.

Although a single antenna 105 is shown that switches between transmitting and receiving, individual receiving and transmitting antennas may be used in alternate embodiments.

When the UWB system 100 is receiving a signal, the antenna 105 converts an incoming UWB electromagnetic waveform into an electrical signal (or optical signal) and provides this signal to the switch 110. In a receiving mode the switch 110 is connected to the receiver front end 122 in the RF PMD 120, which performs analog signal processing on the incoming signal. Depending on the type of waveform, the receiver front end 122 processes the electrical (or optical) signals so that the level of the signal and spectral components of the signal are suitable for processing in the demodulator 124. This processing may include spectral shaping, such as a matched filtering, partially matched filtering, simple roll-off, etc.

The received signal is then passed from the receiver front end 122 through the demodulator 124 and the receiver baseband 132 for signal processing to extract the information from the incoming signal. The demodulator 124 performs analog signal processing on the incoming RF signal, which is then converted (preferably by either the demodulator 124 or the receiver baseband 132) for digital processing by the receiver baseband 132.

The information extracted from the incoming signal is then sent from the receiver baseband 132 to the PLCP 140 to convert it to proper format for the MAC 150. Timing information from the incoming signal (or from a signal output from the demodulator 124) is received by the timing controller 136 and is sent back to timing generators in the demodulator 124 and the modulator 128. (See FIG. 2 and related discussion.)

The MAC 150 serves as an interface between the UWB wireless communication functions implemented by both the RF PMD 120 and the digital PMD and the application layer 185 that uses the UWB communications channel for exchanging data with the device 180. The MAC 150 is preferably a processor-based unit that is implemented either with hard-wired logic, such as in one or more application specific integrated circuits (ASICs) or in one or more programmable processors.

The host controller 160 operates as an interface between the MAC 150 and the device 180, and provides instructions to the RF PMD 120, the digital PMD 130, the PLCP 140 and the MAC 150 through the MAC manager 170 and the PHY layer manager 175. In this embodiment the host controller 160 is shown as being separate from the device 180. In alternate embodiments all or part of the host controller 160 can be placed in the device 180.

Figure 2:
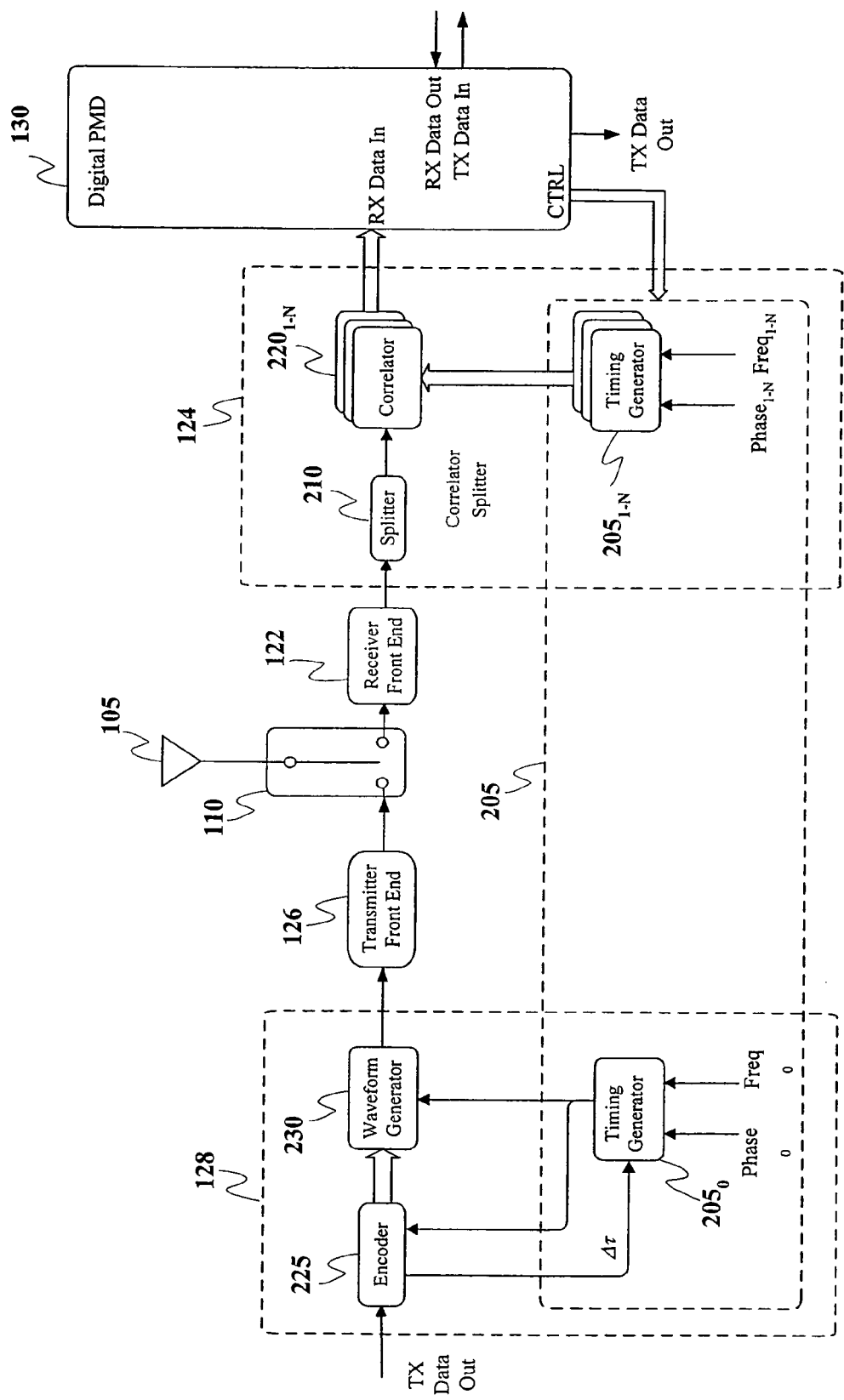
FIG. 2 is a block diagram of an ultra-wide band (UWB) transceiver according to a preferred embodiment of the present invention.

FIG. 2 is a more detailed block diagram of the UWB transceiver of FIG. 1. As shown in FIG. 2, the UWB transceiver includes an antenna 105, a transmit/receive (T/R) switch 110, a receiver front end 122, a transmitter front end 126, a demodulator 124, a modulator 128, and a digital PMD 130. The demodulator 124 includes a splitter 210, a plurality of correlators $220_1$-$220_N$, and a plurality of input timing generators $825_1$-$825_N$. The modulator 128 includes an output timing generator $205_0$, an encoder 225, and a waveform generator 230. In this embodiment the output timing generator $205_0$ and the plurality of input timing generators $205_1$-$205_N$ are formed together into a single timing generator module 205. This embodiment allows multiple fingers (also called arms) to process the incoming signal at the same time, increasing the speed and efficiency of acquisition and tracking.

The T/R switch 110 connects the antenna 105 to either the receiver front end 122, or the transmitter front end 126, depending upon whether the transceiver is transmitting or receiving. In alternate embodiments separate transmitting and receiving antennas could be used.

When receiving energy through the antenna 105, the received energy is coupled in to the T/R switch 110, which passes the energy to the receiver front end 122 as an incoming signal. The receiver front end 122 filters, extracts noise, and adjusts the amplitude of the incoming signal before providing the same to the splitter 210 in the demodulator 124.

The splitter 210 divides the incoming signal up into N copies of the incoming signal and applies the N incoming signals to respective correlators $220_1$-$220_N$. Each of the correlators $220_1$-$220_N$ receives a clock input signal from a respective input timing generator $205_1$-$205_N$ of the timing generator module 205 as shown in FIG. 2. Each of these correlators corresponds to a different finger of the transceiver.

The input timing generators $205_1$-$205_N$ receive a phase and frequency adjustment signal from the digital PMD 130, but may also receive a fast modulation signal or other control signals as well. The digital PMD 130 may also provide control signals (e.g., phase, frequency and fast modulation signals, etc.) to the timing generator module 205 for time synchronization and modulation control. The fast modulation control signal may be used to implement, for example, chirp waveforms, PPM waveforms, such as fast time scale PPM waveforms, etc.

The digital PMD 130 may also provide control signals to, for example, the encoder 225, the waveform generator 230, and the transmitter front end 126, the T/R switch 110, the receiver front end 122, the correlators $220_1$-$220_N$, etc., for controlling, for example, amplifier gains, signal waveforms, filter passbands and notch functions, alternative demodulation and detecting processes, user codes, spreading codes, cover codes, etc.

During signal acquisition, the digital PMD 130 adjusts the phase input of the first input timing generator $205_1$, in an attempt for the first tracking correlator $220_1$ to identify and the match the timing of the signal produced at the receiver with the timing of the arriving signal. When the received signal and the locally-generated signal coincide in time with one another, the digital PMD 130 senses the high signal strength or high SNR and begins to track, indicating that the receiver is synchronized with the received signal.

Once synchronized, the receiver will operate in a track mode, where the first input timing generator $205_1$ is adjusted by way of a continuing series of phase adjustments to counteract any differences in timing of the first input timing generator $205_1$ and the incoming signal. However, a feature of the present invention is that by sensing the mean of the phase adjustments over a known period of time, the digital PMD 130 adjusts the frequency of the first input timing generator $205_1$ so that the mean of the phase adjustments becomes zero.

The frequency is adjusted in this instance because it is clear from the pattern of phase adjustments that there is a frequency offset between the first input timing generator $205_1$ and the clocking of the received signal. Similar operations may be performed on the second through $N^{th}$ input timing generators $205_2$-$205_N$, so that each finger of the receiver can recover the signal delayed by different amounts, such as the delays caused by multipath (i.e., scattering along different paths via reflecting off of local objects).

A feature of the transceiver in FIG. 2 is that it includes a plurality of tracking correlators $220_1$-$220_N$. By providing a plurality of correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The digital PMD 130 receives the information from the different correlators $220_1$-$220_N$ and decodes the data. The digital PMD 130 also provides control signals for controlling the receiver front end 122, e.g., such as gain, filter selection, filter adaptation, etc., and adjusting the synchronization and tracking operations by way of the timing generator module 205.

The digital PMD 130 is connected to the PLCP 140 (not shown in FIG. 2), which serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, an output timing generator $205_O$ also receives phase, frequency and/or fast modulation adjustment signals for use in encoding a UWB waveform from the digital PMD 130. Data and user codes (via a control signal) are provided to the encoder 225, which in the case of an embodiment of the present invention using time-modulation passes command signals (e.g., $\Delta t$) to the output timing generator $205_O$ for providing the time at which to send a pulse. In this way, encoding of the data into the transmitted waveform may be performed.

When the shape of the different pulses are modulated according to the data and/or codes, the encoder 225 produces the command signals as a way to select different shapes for generating particular waveforms in the waveform generator 230. For example, the data may be grouped in multiple data bits per channel symbol. The waveform generator 230 then produces the requested waveform at a particular time as indicated by the timing generator $205_O$. The output of the waveform generator is then filtered and amplified as needed in the transmitter front end 126 before being transmitted from the antenna 105 by way of the T/R switch 110.

In another embodiment of the present invention, the transmit power is set low enough that the transmitter and receiver are simply alternately powered down without need for the T/R switch 110. Also, in some embodiments of the present invention no transmitter front end 126 is needed because the desired power level and spectrum are directly useable from the waveform generator 230. In addition, the transmitter front end 126 may be included in the waveform generator 230 depending on the implementation of the present invention.

A feature of the UWB communications system disclosed, is that a transmitted waveform can be made to have a nearly continuous power flow, for example, by using a high chipping rate, where individual wavelets in the waveform are placed nearly back-to-back. This configuration allows the system to operate at low peak voltages, yet produce ample average transmit power to operate effectively. As a result, sub-micron geometry CMOS switches, for example, running at one-volt levels, can be used to directly drive the antenna 105 such that no separate amplification is required in the transmitter front end 126. In this way, the entire radio can be integrated on a single monolithic integrated circuit.

Under certain operating conditions, the system can be operated without any filters in the transmitter front end 126. If, however, the system is to be operated, for example, with another radio system, the transmitter front end 126 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Figure 3:
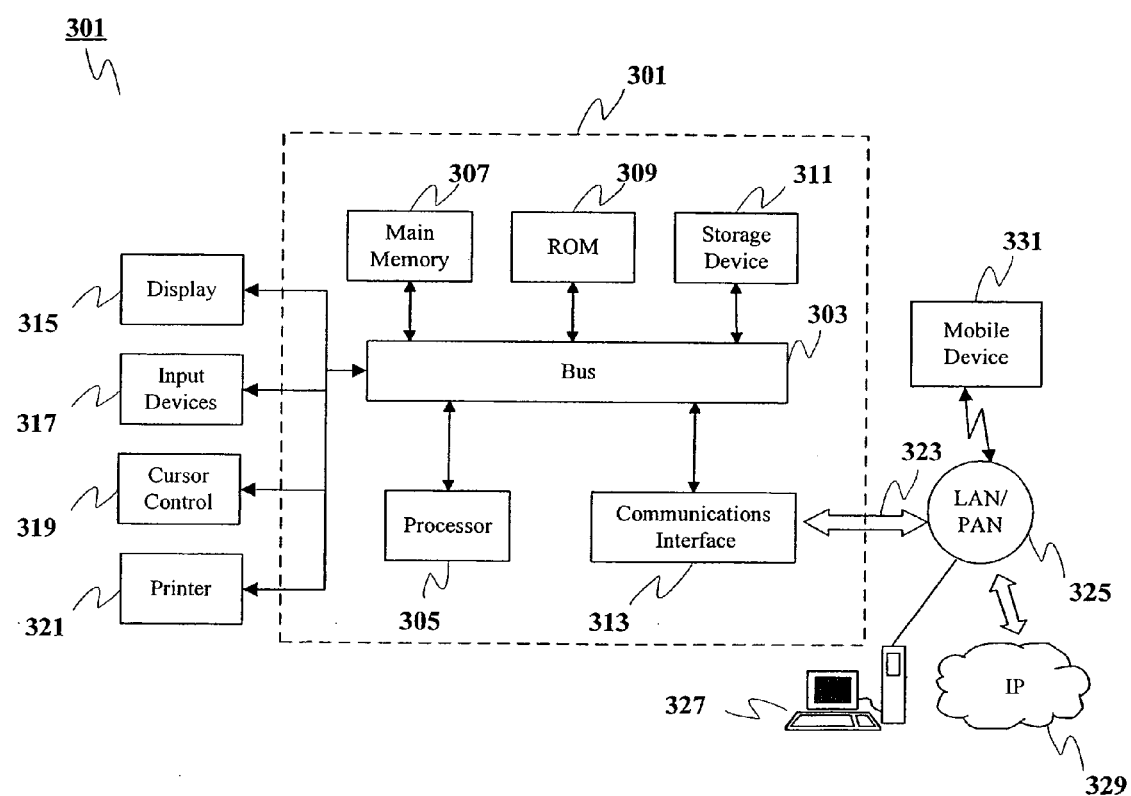
FIG. 3 illustrates a processor system according to a preferred embodiment of the present invention.

FIG. 3 illustrates a processor system 300 according to a preferred embodiment of the present invention. In this embodiment, the processor system 300 includes a processor unit 301, a display 315, one or more input devices 317, a cursor control 319, a printer 321, a network link 323, a communications network 325, a host computer 327, an Internet Protocol (IP) network 329, and a mobile device 331. The processor unit 301 includes a bus 303, a processor 305, a main memory 307, a read only memory (ROM) 309, a storage device 311, and a communication interface 313. Alternate embodiments may omit various elements.

The bus 303 operates to communicate information throughout the processor unit. It is preferably a data bus or other communication mechanism for communicating information.

The processor 305 is coupled with the bus 303 and operates to process the information.

The main memory 307 may be a random access memory (RAM) or other dynamic storage device (e.g., dynamic RAM (DRAM), static RAM (SRAM), synchronous DRAM (SDRAM), flash RAM). It is preferably coupled to the bus 303 for storing information and instructions to be executed by the processor 305. In addition, a main memory 307 may be used for storing temporary variables or other intermediate information during execution of instructions to be executed by the processor 305.

The ROM 309 may be a simple read-only memory, or may be another kind of static storage device (e.g., programmable ROM (PROM), erasable PROM (EPROM), and electrically erasable PROM (EEPROM)). It is coupled to the bus 303 and stores static information and instructions for the processor 305.

The storage device 311 may be a magnetic disk, an optical disc, or any other device suitable for storing data. It is provided and coupled to the bus 303 and stores information and instructions.

The processor unit 301 may also include special purpose logic devices (e.g., application specific integrated circuits (ASICs)) or configurable logic devices (e.g., simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives may be added to the processor unit 301 using an appropriate device bus (e.g., a small system interface (SCSI) bus, an enhanced integrated device electronics (IDE) bus, or an ultra-direct memory access (DMA) bus). The processor unit 301 may additionally include a compact disc reader, a compact disc reader-writer unit, or a compact disc jukebox, each of which may be connected to the same device bus or another device bus.

The processor system 301 may be coupled via the bus 303 to the display 315. The display unit may be a cathode ray tube (CRT), a liquid crystal display (LCD), or any other suitable device for displaying information to a system user. A display or graphics card may control the display 315.

The processor system 301 is also preferably connected to the one or more input devices 317 and a cursor control 319 for communicating information and command selections to the processor 305. The one or more input devices may include a keyboard, keypad, or other device for transferring information and command selections. The cursor control 319 may be a mouse, a trackball, cursor direction keys, or any suitable device for communicating direction information and command selections to the processor 305 and for controlling cursor movement on the display 315.

In addition, a printer 321 may provide printed listings of the data structures or any other data stored and/or generated by the processor system 301.

The processor unit 301 performs a portion of all of the processing steps of the invention in response to the processor 305 executing one or more sequences of one or more instructions contained in a memory, such as the main memory 307. Such instructions may be read into the main memory 307 from another computer-readable medium, such as a storage device 311. One or more processors in a multi-processing arrangement may also be employed to execute the sequences of instructions contained in the main memory 307. In alternative embodiments, hard-wired circuitry may be used in place of or in combination with software instructions. Thus, embodiments are not limited to any specific combination of hardware circuitry and software.

As stated above, the processor unit 301 includes at least one computer readable medium or memory programmed according to the teachings of the invention and for containing data structures, tables, records, or other data described herein. Stored on any one or on a combination of computer readable media, the present invention includes software for controlling the system 301, for driving a device or devices for implementing the invention, and for enabling the system 301 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 305 for execution. A computer readable medium may take many forms, including but not limited to, non-volatile media, volatile media, and transmission media. Non-volatile media includes, for example, optical, magnetic disks, and magneto-optical disks, such as the storage device 311. Volatile media includes dynamic memory, such as the main memory 307. Transmission media includes coaxial cables, copper wire and fiber optics, including the wires that comprise the bus 303. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 305 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 301 may receive the data on the telephone line and use an infrared transmitter to convert the data to an infrared signal. An infrared detector coupled to the bus 303 can receive the data carried in the infrared signal and place the data on the bus 303. The bus 303 carries the data to the main memory 307, from which the processor 305 retrieves and executes the instructions. The instructions received by the main memory 307 may optionally be stored on a storage device 311 either before or after execution by the processor 305.

The communications interface 313 provides a two-way UWB data communication coupling to a network link 323, which is connected to the communications network 325. The communications network 325 may be a local area network (LAN), a personal area network (PAN), or the like. For example, the communication interface 313 may be a network interface card and the communications network may be a packet switched UWB-enabled PAN. As another example, the communication interface 313 may be a UWB accessible asymmetrical digital subscriber line (ADSL) card, an integrated services digital network (ISDN) card, or a modem to provide a data communication connection to a corresponding type of communications line.

The communications interface 313 may also include the hardware to provide a two-way wireless communications coupling other than a UWB coupling, or a hardwired coupling to the network link 323. Thus, the communications interface 313 may incorporate the UWB transceiver of FIG. 1 or FIG. 8 as part of a universal interface that includes hardwired and non-UWB wireless communications coupling to the network link 323.

The network link 323 typically provides data communication through one or more networks to other data devices. For example, the network link 323 may provide a connection through a LAN to the host computer 327 or to data equipment operated by a service provider, which provides data communication services through the IP network 329. Moreover, the network link 323 may provide a connection through the communications network 325 to the mobile device 331, e.g., a personal data assistant (PDA), laptop computer, or cellular telephone.

The communications network 325 and IP network 329 both preferably use electrical, electromagnetic, or optical signals that carry digital data streams. The signals through the various networks and the signals on the network link 323 and through the communication interface 313, which carry the digital data to and from the system 301, are exemplary forms of carrier waves transporting the information. The processor unit 301 can transmit notifications and receive data, including program code, through the communications network 325, the network link 323, and the communication interface 313.

The present invention uses the benefits offered by ultra wide band spread spectrum technology. From an energy spreading perspective, or from a resolution perspective, bandwidth and center frequency can be treated independently. The name UWB, however, was coined by a DARPA study panel and though the term "relative bandwidth" does not appear in the name, a definition of UWB demands use of this term.

As recognized by the present inventors, the motivations for preferring definitions based on bandwidth relative to center frequency follow from three primary desirable features. The first is immunity to scintillation and multipath fading. The only way to prevent scintillation, speckle, and multipath fading is to have resolution that is approximately equal to the wavelength. The second is penetrating materials with high bandwidth signals.

To communicate at the highest data rates through lossy media (i.e., media subject to high losses), or to do the highest resolution radar imaging through or within lossy media, requires both low frequencies (to penetrate) and wide bandwidths (to resolve), which when taken together require wide relative bandwidth. In this case, losses at higher frequencies are so great that these higher frequencies cannot be used. The definition of UWB is based on relative bandwidth because these benefits derive specifically from wide relative bandwidth and cannot be obtained with narrowband systems. A more complete discussion of the benefits of UWB communications signals can be found in application Ser. No. 09/078,616 referenced above and incorporated herein by reference.

If B is the bandwidth, $f_c$ is the center frequency, and $f_h$ and $f_l$ are the high and low frequency cutoffs (e.g. −6 dB from peak), then the fractional bandwidth, $B_f$, is defined as $$B_f = \frac{B}{f_c} = \frac{(f_h - f_l)}{(f_h + f_l)/2}. \tag{1}$$

A UWB system is one that has a fractional bandwidth, $B_f$, in the range of 0.25 to 2.0, which means that a UWB system approximately matches its bandwidth to its center frequency. Said another way, this means that a UWB system matches resolution to wavelength.

The present invention provides a system and method that enables device functions based on distance information. More specifically, the present invention allows a simplified method for enabling communications between a local wireless device and a remote wireless device based on the distance between the wireless devices. In order to provide such a distance-based system that is practically usable, the wireless devices involved must be able to discriminate distances at fine intervals; or stated another way, the wireless device must have accurate range resolution.

The present inventors have recognized that the range resolution of a receiver is roughly inverse to the bandwidth of the transmit signal. Therefore, narrowband systems having a bandwidth of 1 MHZ, such as the Bluetooth technology previously discussed, have a range resolution of $$R_{res} = \frac{c}{BW} = \frac{3 \times 10^8 \text{ m/sec}}{1 \text{ MHz}} = 300 \text{ m} \tag{2}$$

Therefore, a device implementing Bluetooth protocol even if configured to determine distance, can discriminate between remote devices based on distance only if the devices are 300 meters apart. Similarly, wireless devices based on IEEE 802.11 A and B standards have a bandwidth of 20 MHZ and a range resolution of 15 meters or approximately 45 feet. This resolution does not provide the ability to discriminate between remote devices using distance information that is needed for short range exchanges that are typical of wireless hand held devices such as the exchange of electronic business cards.

The present inventors have recognized that using an ultra wide band system, range resolutions can be accomplished that have practical significance in distinguishing between remote wireless devices. For example, an ultra wide bandwidth system having 3 GHz of bandwidth has a range resolution of 0.1 meters. Even greater bandwidth systems can accomplish resolutions on the order of centimeters. Thus, as realized by the present inventors, a local UWB device can compute a unique distance to remote UWB devices as long as the actual distance from the local device to each remote device differs on the order of centimeters, which is a common scenario for current uses of wireless devices such as PDAs.

Figure 4:
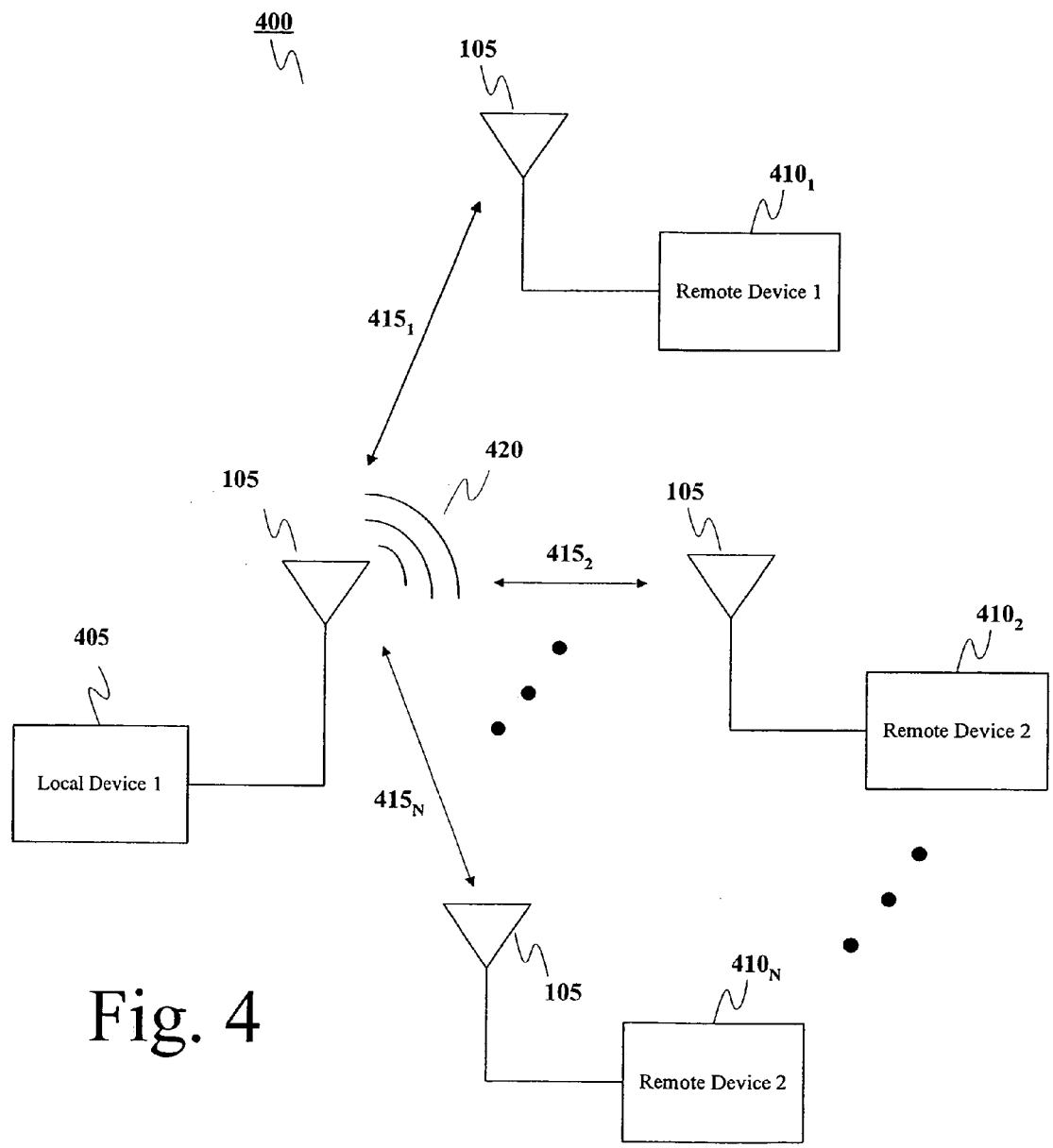
FIG. 4 is a diagram depicting the interconnection of devices according to a preferred embodiment of the present invention.

FIG. 4 discloses a wireless network 400 in which a plurality of wireless devices may exchange information. The wireless network 400 may be WPAN, WLAN, or some other wireless network in which wireless devices make point-to-point connections, or point-to-multipoint connections on the shared channel of a piconet. The wireless network 400 includes a local device 405 and first through $N^{th}$ remote devices $410_1$-$410_N$.

The local device 405 is linked to the first through $N^{th}$ remote devices $410_1$-$410_N$ via UWB links $415_1$-$415_N$, respectively. The UWB links are preferably full duplex communications links that carry data, voice, video, or any other analog or digital information in accordance with the present invention. However, simplex communications in either direction may be used in alternate embodiments.

Each of the wireless devices 405 and $410_1$ through $410_N$ may be a mobile device such as a mobile telephone, a laptop computer or personal digital assistant (PDA), or a fixed structure device such as a retail store kiosk or some other fixed structure device for delivering information to other wireless devices. It is to be understood that device 405 is referred to as a "local device" and devices $410_1$ through $410_N$ are referred to as "remote devices" for purposes of description only, and that the present invention is not limited to an infrastructure system having an access point and may be implemented in an ad hoc system wherein any device in the network can act as a master and/or a slave device and no access point is needed.

Each of the of the devices 405 and $410_1$ through $410_N$ includes a processor system, such as the one described in FIG. 3, for inputting, storing, and processing data in accordance with the present invention. Therefore, local device 405 and each remote device $410_1$ through $410_N$ also includes a UWB transceiver, such as the transceiver described in FIGS. 1 and 2, that transmits and receives a UWB signal 420 via a UWB antenna such as the antennas 105 described in FIGS. 1 and 2.

The UWB antenna 105 is preferably an antenna as described in the patent application entitled ELECTRICALLY SMALL PLANAR UWB ANTENNA (Attorney Docket 10188-0005-8), or application Ser. No. 09/563,292, filed May 3, 2000 entitled PLANAR UWB ANTENNA WITH INTEGRATED TRANSMITTER AND RECEIVER CIRCUITS (Attorney Docket 10188-0006-8) referenced above and incorporated herein by reference, but may be any known UWB antenna. The UWB signal 420 includes data for communicating with remote devices based on distance in accordance with the present invention.

Figure 5:
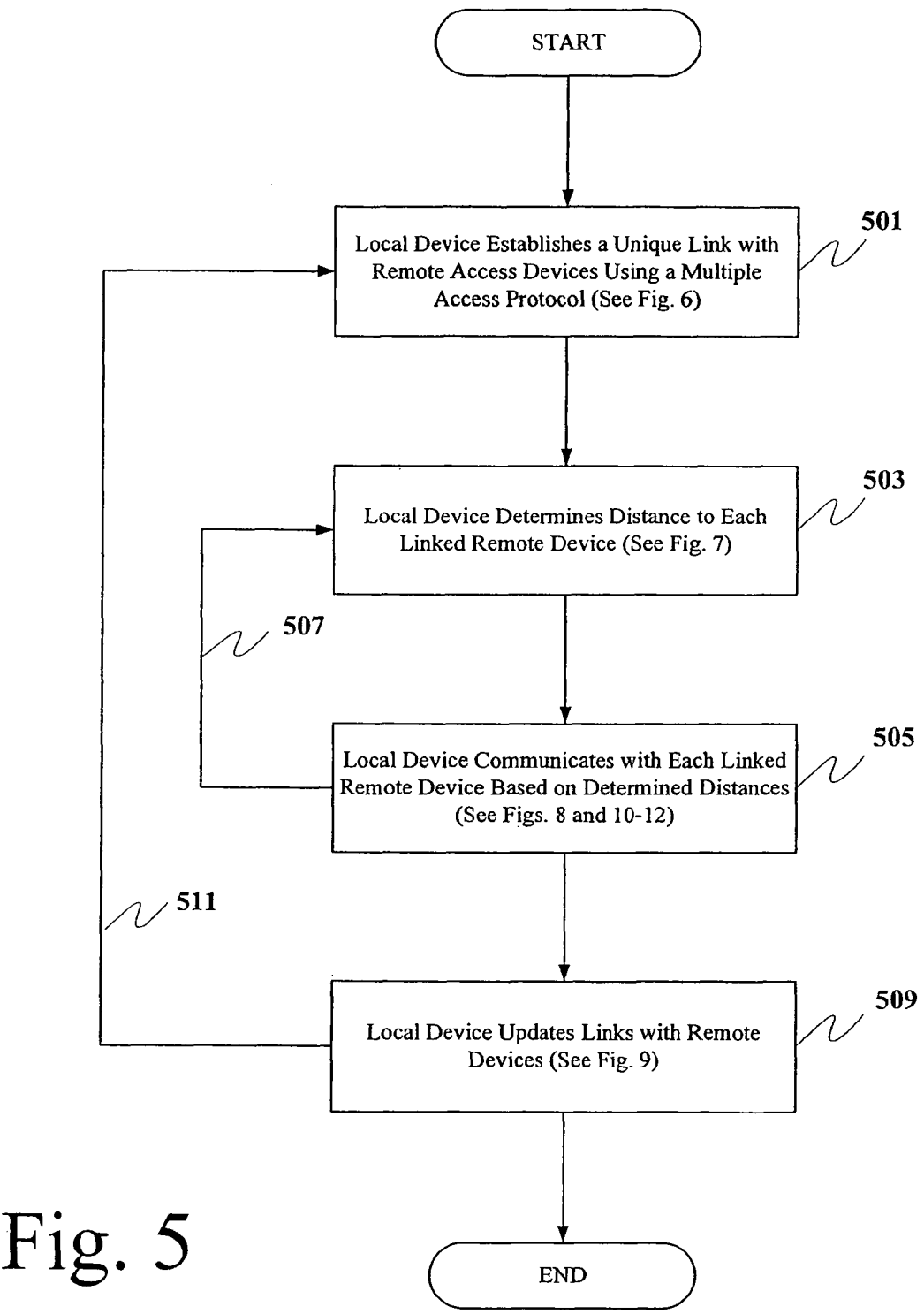
FIG. 5 is a flow chart describing a process for communicating with remote wireless devices based on distance information according to a preferred embodiment of the present invention.

FIG. 5 is a general flow chart that describes a process for enabling device functions based on distance information in accordance with the present invention. The process starts when a device is turned on or enters the listening range of other wireless devices communicating on a wireless network. In step 501, the local device 405 establishes a link with each remote device $410_1$ through $410_N$ using a multiple access protocol. Examples of multiple access protocols may be found in the IEEE 802.11 standard, final draft approved Jun. 26, 1997, and the Bluetooth specification "Specification of the Bluetooth System", V.1.0B, Dec. 1, 1999, core specification —Vol. 1, the entire contents of which are incorporated herein by reference.

It is to be understood that the features and benefits of the present invention do not depend on a particular multiple access protocol and any of the above named protocols or any other multiple access protocol may be used to practice the present invention as will be understood to one of ordinary skill in the art. However, in a preferred embodiment, the multiple access protocol provides the capability for the local device 405 to establish unique and independent UWB links $415_1, 415_2, \ldots, 415_N$ with remote devices $410_1, 410_2, \ldots, 410_N$ respectively as will be discussed with respect to the exemplary protocol of FIG. 6.

After unique links $415_1, 415_2, \ldots, 415_N$ are established, the local device 405 determines a distance to each linked remote device as shown in step 503. In determining the distance, local device 405 exchanges data with remote devices $410_1, 410_2, \ldots 410_N$ via their respective unique links. Each distance determined by the local device 405 is associated with the unique link on which the distance determining information was exchanged in order to associate a determined distance with a remote device as will be discussed below with reference to FIG. 7.

Once the distance to each remote device is determined, the local device 405 then enables communications with each remote device in step 505 based on the distances determined in step 503. Due to the range resolution of the UWB system included in each of the devices of FIG. 4, the distance determined may be accurate on the order of centimeters, as discussed above. Therefore the probability of having remote devices at equal distances is very low and the local device 405 can differentiate between remote devices $410_1, 410_2, \ldots, 410_N$ based on the distance determined for each device. For example, the local device may automatically enable data communications with devices that are within a predefined range at any given time while all remote devices outside the predefined range will be blocked from data communications with the local device as will be described below with respect to FIG. 8.

Alternatively, the local device may enable data communications with devices that enter a predefined authentication range and maintain data communications with such devices until the user of the local device decides to terminate data communications with an authenticated remote device as will be described below with respect to FIG. 10.

Or a local device may display a positional map of all users in relation to the local device so that the user of the local device may select those remote devices that the user wants to communicate with as will be discussed below with respect to FIGS. 11 and 12.

It is to be understood that while the above examples discuss enabling and blocking data communications based on distance to remote device, advantages of the present invention may be obtained when any function of the local device 405 is performed using the distance information obtained in step 503. For example, the local device 405 may store data sent from remote devices within a predefined range while only displaying the information sent from remote devices outside that range. As another example, the local device 405 may notify the device user or automatically enter a sleep mode if no remote devices are within a predefined range. These or any other internal functions of the local device 405 may be accomplished based on distance information obtained in accordance with the present invention.

According to a preferred embodiment, in addition to determining the distance to remote devices $410_1$ through $410_N$ and enabling communications based on the distance determined, the local device 405 updates distance information by way of a loop 507. The loop 507 returns to step 503 (determining distance for the remote devices) and may be performed only on devices that have been blocked from communicating with the local device 405, or on both enabled and blocked remote devices.

In step 509, the local device 405 periodically updates its links to the remote devices $410_1$ through $410_N$. In doing so, another loop 511 is established, which returns to step 501 (establishing a unique link with remote devices). In executing loop 511, the local device 405 determines if remote devices that were previously linked to are no longer available, and whether new devices have entered the listening range of the local device 405. Unique communications links are then destroyed or created in step 509 depending on the information obtained by executing the loop 511.

The process of enabling device functions and/or communicating with remote wireless devices ends when power to the local device 405 is turned off or the local device is outside the communicating area of the remote devices $410_1$ through $410_N$. While "end" is shown as proceeding from step 509 in FIG. 5, it is to be understood that the end may occur at any point in the process of FIG. 5.

Figure 6:
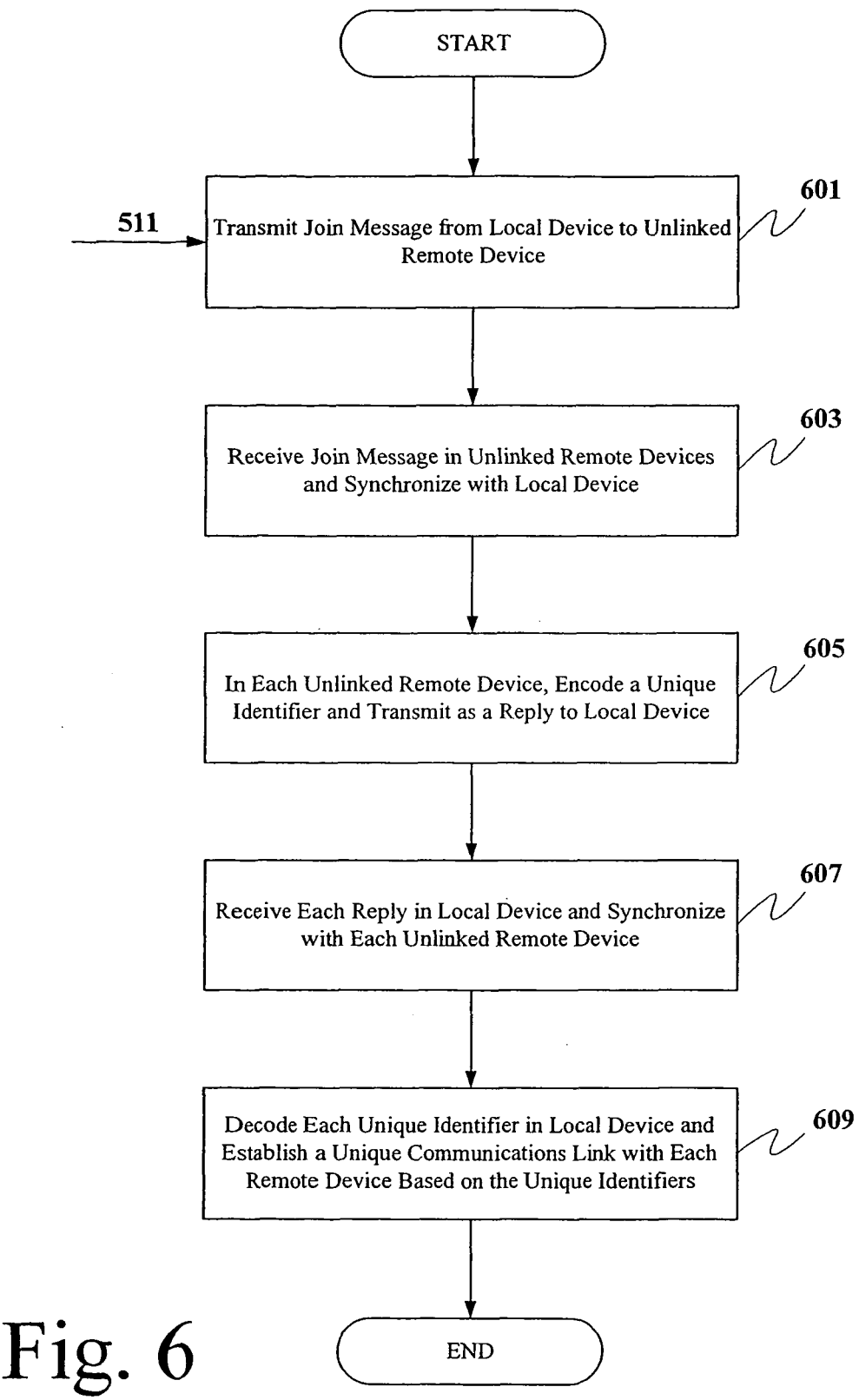
FIG. 6 is a flow chart describing the process of establishing a link with remote devices using a multiple access protocol according to a preferred embodiment of the present invention.

FIG. 6 is a flow chart describing the process whereby the local device 405 establishes unique communication links $415_1, 415_2, \ldots, 415_N$ with remote devices $410_1, 410_2, \ldots, 410_N$, respectively by using an exemplary multiple access protocol in accordance with the present invention. In step 601, the local device 405 transmits a join message to all unlinked remote devices within a range of the transmission power of the local device 405. The join message may be a simple UWB signal that enables unlinked remote devices to synchronize to the local device 405, or may include information such as a device identifier, a device type identifier, a standard bit code, and/or any other information desired to be transmitted from local device 405 to the unlinked remote devices $410_1$ through $410_N$. According to a preferred embodiment, the join message is transmitted only to unlinked remote devices and not over the unique links of synchronized remote devices, so that the local device 405 may form unique links with new remote devices entering step 601 (as indicated by loop 511) in FIG. 6.

In step 603, each remote device that is listening then receives the join message and synchronizes with the local device 405. In step 603, each of the remote devices $410_1$ through $410_N$ aligns in time a particular pulse sequence produced in the remote device with the pulse sequence of the joint signal sent from the local device. This synchronization of the remote devices $410_1$ through $410_N$ is preferably performed in accordance with the process described in any one of the following patent applications: Ser. No. 09/685,195, for "ULTRA WIDE BANDWIDTH SYSTEM AND METHOD FOR FAST SYNCHRONIZATION," filed Oct. 10, 2000, Ser. No. 09/684,401, for "ULTRA WIDE BANDWIDTH SYSTEM AND METHOD FOR FAST SYNCHRONIZATION USING SUB CODE SPINS," filed Oct. 10, 2000; and Ser. No. 09/685,196, for "ULTRA WIDE BANDWIDTH SYSTEM AND METHOD FOR FAST SYNCHRONIZATION USING MULTIPLE DETECTION ARMS," filed Oct. 10, 2000, which are incorporated by reference in their entirely. However, synchronization may take place by any known method of synchronizing wireless devices.

Once the remote devices $410_1$ through $410_N$ are synchronized with the transmitted signal of the local device 405, each remote device transmits a reply to the join signal as shown in step 605. Each reply is a UWB signal that includes a unique identifier associated with the remote device from which the reply is transmitted. The unique identifier may be a device address stored in ROM 309 (see FIG. 3), for example, or a unique delay time for the remote device as will be described below. Thus, in step 605, each of the remote devices 410₁ through 410_N encodes its unique identifier information and attaches the information to a reply signal to be transmitted back to the local device 405. In step 607, the local device 405 receives each reply and synchronizes with each remote device that sent a reply.

In step 609, the local device 405 decodes each unique identifier and establishes unique communications links 415₁, 415₂, ..., 415_N with remote devices 410₁, 410₂, ..., 410_N, respectively. In establishing the unique communications links, the local device 405 associates the unique identifier of each remote device with a communications link established by the synchronization process for the particular remote device. The unique identifier and associated links are then stored to the main memory 307 (See FIG. 3) of the local device 405 for use in determining distance as will be described below.

Each unique link 415₁, 415₂, ..., 415_N is preferably a low-level communications link that is allocated a minimal amount of bandwidth available to the local device 405. The amount of bandwidth allocated may vary but is preferably an amount that is sufficient for the local device 405 to maintain awareness of the presence of the remote devices 410₁ through 410_N and to determine distance to each remote device.

Figure 7:
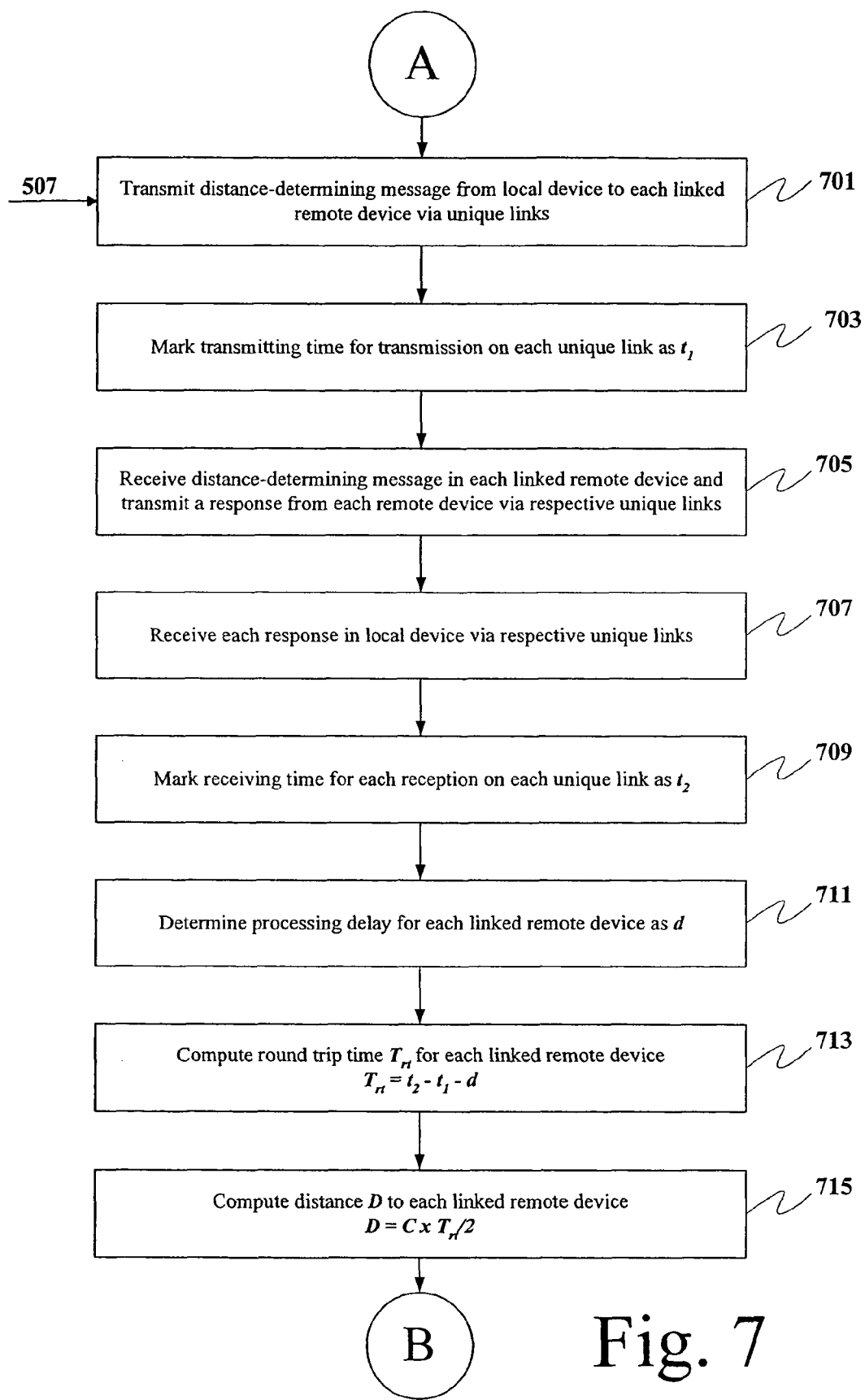
FIG. 7 is a flow chart describing the process of determining distance to a remote device according to a preferred embodiment of the present invention.

FIG. 7 describes a process of determining distance to each linked remote device in accordance with an embodiment of the present invention. In step 701, a distance-determining message is generated in the local device 405 and transmitted to each linked remote device 410₁, 410₂, ..., 410_N via the unique communication links 415₁, 415₂, ..., 415_N. In an initial situation where the local device 405 has not enabled communications with any of the remote devices 410₁ through 410_N either because no distance information is known or because all remote devices have been blocked, the distance determining message is a simple UWB signal the acts as a notification and/or request to each remote device that a distance determination is being made by the local device 405.

Alternatively, where the local device 405 knows distance information for the remote devices and has enabled communications for certain remote devices, the distance determining message may be attached to a communication for a particular link as indicated by input 507 and as will be described with respect to FIG. 8.

For each distance determining message sent on each unique communications link 410₁ through 410_N, the local device 405 marks a time $t_1$ as the transmitting time that the message was sent out for the particular communications link as shown in step 703. Transmit time $t_1$ is obtained by a system clock in the processor system 301 of the local device 405. Each transmit time $t_1$ is associated with one of the unique identifiers stored in step 609 based on the unique link over which the distance determining massage was transmitted. The transmit times and associated identifiers are then stored in the main memory 307 of local device 405 so that the transmit times may be retrieved to determine the distance to each remote device.

In step 705, the linked remote devices 410₁, 410₂, ..., 410_N receive the distance-determining message via a respective unique link and transmit a response to the local device 405 over the same unique link. As with the distance-determining message transmitted in step 701, the response message from the remote devices may include a communication if the link responded on is an enabled link.

In step 707, the local device 405 receives responses sent from the linked remote devices via respective unique links and marks a receive time $t_2$ for each response received as seen in step 709. As with the transmit times $t_1$, each receive time $t_2$ is associated with the unique identifier of a respective link and stored in main memory 307 for use in calculating a distance from the local device 405 to each remote device 410₁ through 410_N.

Before computing a distance to each linked remote device, the local device 405 first determines a processing delay d for each linked remote device as seen in step 711. The processing delay d is the time delay between the remote device receiving the distance determining message and transmitting a response and includes at least the amount of time necessary for the remote device to process the distance determining message and form a response.

According to one embodiment, the processing delay d is determined by retrieving the delay from the memory of the local device 405. In this embodiment, the local device 405 receives information from each remote device about the radio type of the remote device, as part of the reply and/or response received from the remote devices as discussed with respect to steps 607 and 707 respectively. Alternatively, the type information may be received as part of an independent signal sent by the remote devices. With the remote device type known, the local device 405 then refers to a look up table (LUT) stored in memory 307 or ROM 309 (See FIG. 3) to determine a predefined processing delay for the radio type.

In an alternative embodiment, the processing delay d of each remote device 410ᵢ through 410_N may be transmitted to the local device 405 as part of the reply, the response, or some independent signal. In this embodiment, the processing delay d may be the inherent delay of the remote device plus some arbitrary delay time that gives the remote device a unique delay time the may be used as the unique identifier for the remote device as discussed with respect to step 605 of FIG. 6 above. The processing delay d is then stored in main memory 307 for use in establishing unique communications links with remote devices and in determining the distance to remote devices.

In step 713, the local device 405 calculates the round trip time $T_{rt}$ for each linked remote device 410₁ through 410_N. In this step, the local device 405 retrieves the transmitting time $t_1$, receiving time $t_2$, and processing delay time d of a particular unique link to a remote device from main memory 307 and ROM 309 as discussed above. The processor 305 of the local device 405 then computes the total round trip time according to the following formula:

$$T_{rt} = t_2 - t_1 - d \quad (3)$$

Thus, the round trip time is the time that the distance determining signal and the response signal travel through the wireless medium and is different for each remote device. Each round trip time $T_{rt}$ is stored to main memory 307 where the processor 305 of the local device 405 retrieves values for $T_{rt}$ and computes the distance D to each remote device according to the following formula:

$$D = c \cdot \frac{T_{rt}}{2} \quad (4)$$

where c is the speed of light (i.e., the speed at which an RF signal travels through the wireless medium). The distance D for each remote device 410₁ through 410_N is then associated with the unique identifier of the unique communications link over which the distance was determined and is stored in main memory 307 so that systems software of the local device 405 may retrieve the distance information to enable or block communications with the remote devices based on their distance from the local device 405.

Figure 8:
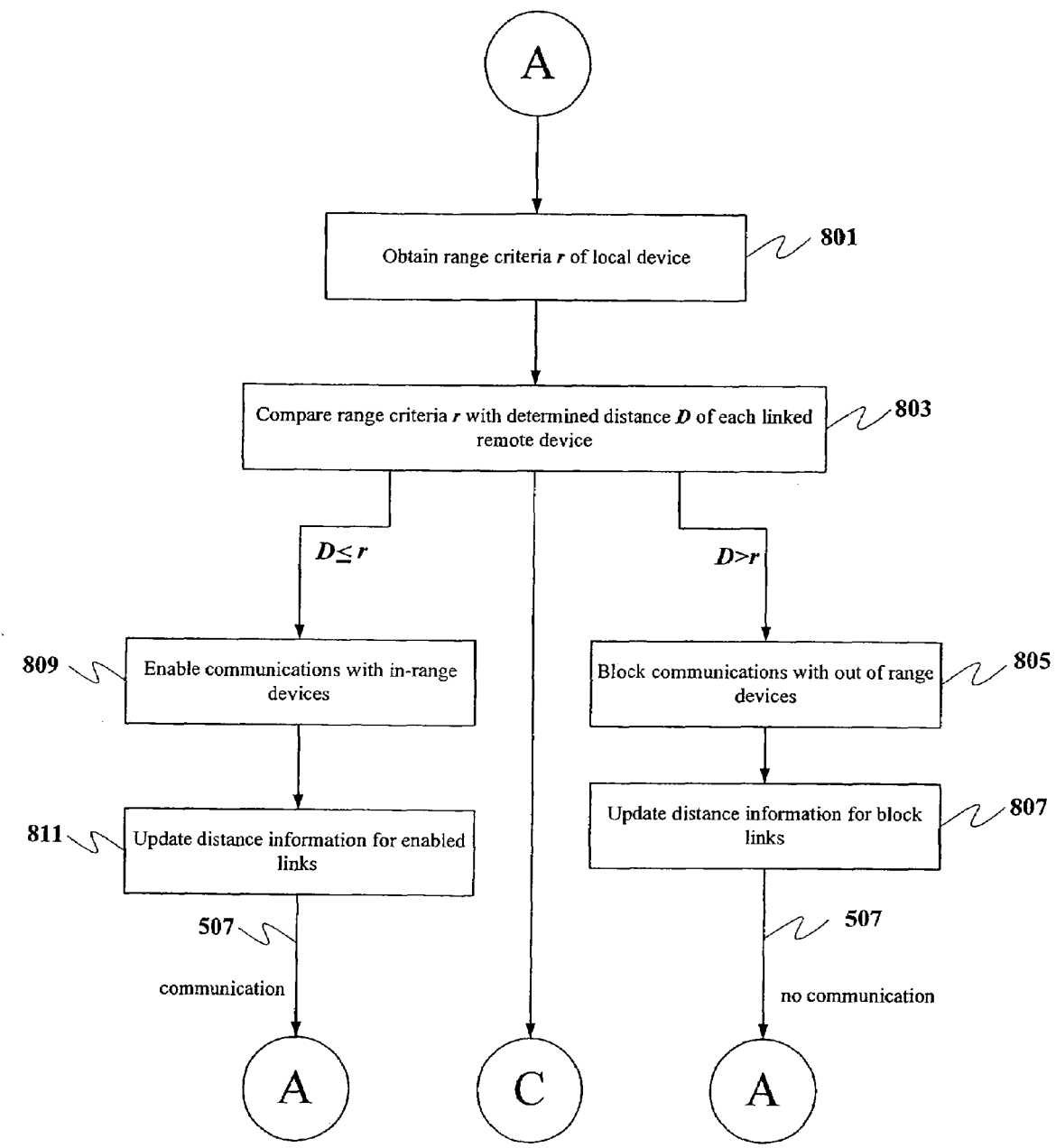
FIGS. 8 and 9 describe alternative processes for communicating with remote devices based on distance information in accordance with other preferred embodiments of the present invention.

FIG. 8 is a flow chart describing the process of automatically enabling or blocking communications with each linked remote device $410_1$ through $410_N$ based on the distance determined in accordance with an embodiment of the present invention.

In step 801, the local device 405 obtains a range criteria r input to the local device. The range criteria r is a predefined distance that serves as a benchmark for enabling communications features of the local device 405 based on distance information. The range criteria r is preferably programmable by the user in which case the user inputs the range criteria into the main memory 307 of the local device 405 via the input device 315 for example, but may be set by the manufacturer of the local device in which case the range criteria is stored in the ROM 309 of the local device 405.

In step 803, the range criteria r is compared with the distance D determined for each remote device and stored in main memory 307 as discussed with respect to step 715 above. In making this comparison, the processor 305 determines whether the distance D for a particular remote device is less than, equal, or greater than the range criteria r.

If the results of the comparison indicate that the distance to the particular remote device is greater that the range criteria (i.e., D>r), the local device determines that the remote device is out of range and, according to the embodiment of FIG. 8, blocks communications with the out of range remote device as shown in step 805.

On the other hand, if the results of the comparison indicate that the distance to a particular remote device is less than or equal to the range criteria (i.e., D≦r), according to the embodiment of FIG. 8, communications are enabled with the in range remote device as shown in step 809.

For example, if the range criteria of the local device 405 is set to be 3 feet, and the distance from the local device 405 to the remote devices $410_1$, $410_2$, and, $410_N$ is 2 feet, 3 feet, and 8 feet, respectively, then the local device 405 enables communications over links $415_1$ and $415_2$ and blocks data communications over link $415_N$. A communication is data, voice, video, or any other analog or digital information sent or received by the user of the local device 405 to or from remote device in accordance with the present invention.

According to one embodiment of the present invention, communications are blocked and enabled at the applications software level of the local device 405. That is, communications transmitted to remote devices are prevented from being sent to the out of range remote devices ($410_N$ in the above example) by the application software sending a command message to the MAC layer of the local device 405 indicating that a particular message should be transmitted on links $415_1$ and $415_2$, but not on links $415_N$. In receiving communications, the applications software displays the communications received on links $415_1$ and $415_2$ to the user, but does not display the communications received on links $415_N$.

In a preferred embodiment, however, communications to and from the out of range remote device $400_N$ may be blocked at the MAC layer in the stack of the local device 405. In this embodiment, the local device 405 allocates a minimal amount of available bandwidth to the link $415_N$ associated with the out-of-range device $400_N$, and a relatively large amount of bandwidth to enabled links associated with in-range remote devices $410_1$ and $410_2$. In other words, a communication sent to remote devices $410_1$ and $410_2$ via links $415_1$ and $415_2$ will not be sent on the blocked communications link. And a communication received from the out-of-range remote device $410_N$ will not be decoded and processed by the local device 405. In this embodiment, the received communications from out of range devices is never processed and propagated up the stack of the local device 405 resulting in a more efficient system.

According to the preferred embodiment, the minimal bandwidth allocated to each of the out of range device $410_N$ is sufficient to update the distance information so that the local device 405 can continue monitoring the distance of the out of range remote device $410_N$ as seen in step 807. In updating the distance information, a new distance-determining signal is sent to the blocked remote device $410_N$ via link $415_N$ in accordance with the loop 507 as discussed in FIGS. 5 and 7. Therefore, the distance from the local device 405 to the out of range remote device $410_N$ is again determined by transmitting a distance determining signal in accordance with the process of FIG. 7.

Because the remote device $410_N$ is out of range, however, no communications are attached to the distance determining signal as indicated in FIG. 8. If on the next distance determining message the distance to the remote device $410_N$ has changed due to movement of the remote device $410_N$ or the local device 405, then the local device 405 enables communications with the remote device $410_N$, if the new distances are less than or equal to the range criteria as seen in step 809. This operation is performed as necessary for each of the remote devices $410_1$, $410_2$, . . . , $410_N$ that are out of range.

In enabling communications in step 809, the local device 405 allocates a large amount of the available bandwidth to the communications links $415_1$ and $415_2$ associated with the remote devices $410_1$ and $410_2$ so that communications can be transmitted or received over these links as discussed above. In addition to transmitting and receiving communications on the enabled links, the local device also updates distance information for the enabled remote devices $410_1$ and $410_2$ as shown in step 811.

In updating the distance information, a new distance-determining signal is sent to the enabled remote devices $410_1$ and $410_2$ via links $415_1$ and $415_2$, respectively in accordance with the loop 507. Therefore, the distance from the local device 405 to the in range remote devices $410_1$ and $410_2$ is again determined by transmitting a distance determining signal in accordance with the process of FIG. 7.

Because the remote devices $410_1$ and $410_2$ are within the range criteria, communications may be attached to the distance-determining signal as indicated in FIG. 8. If on the next distance determining message the distance to the remote devices $410_1$ and $410_2$ have become greater than the range criteria, then the remote devices are determined to now be out of range and the local device 405 blocks communications as seen in step 805.

Figure 9:
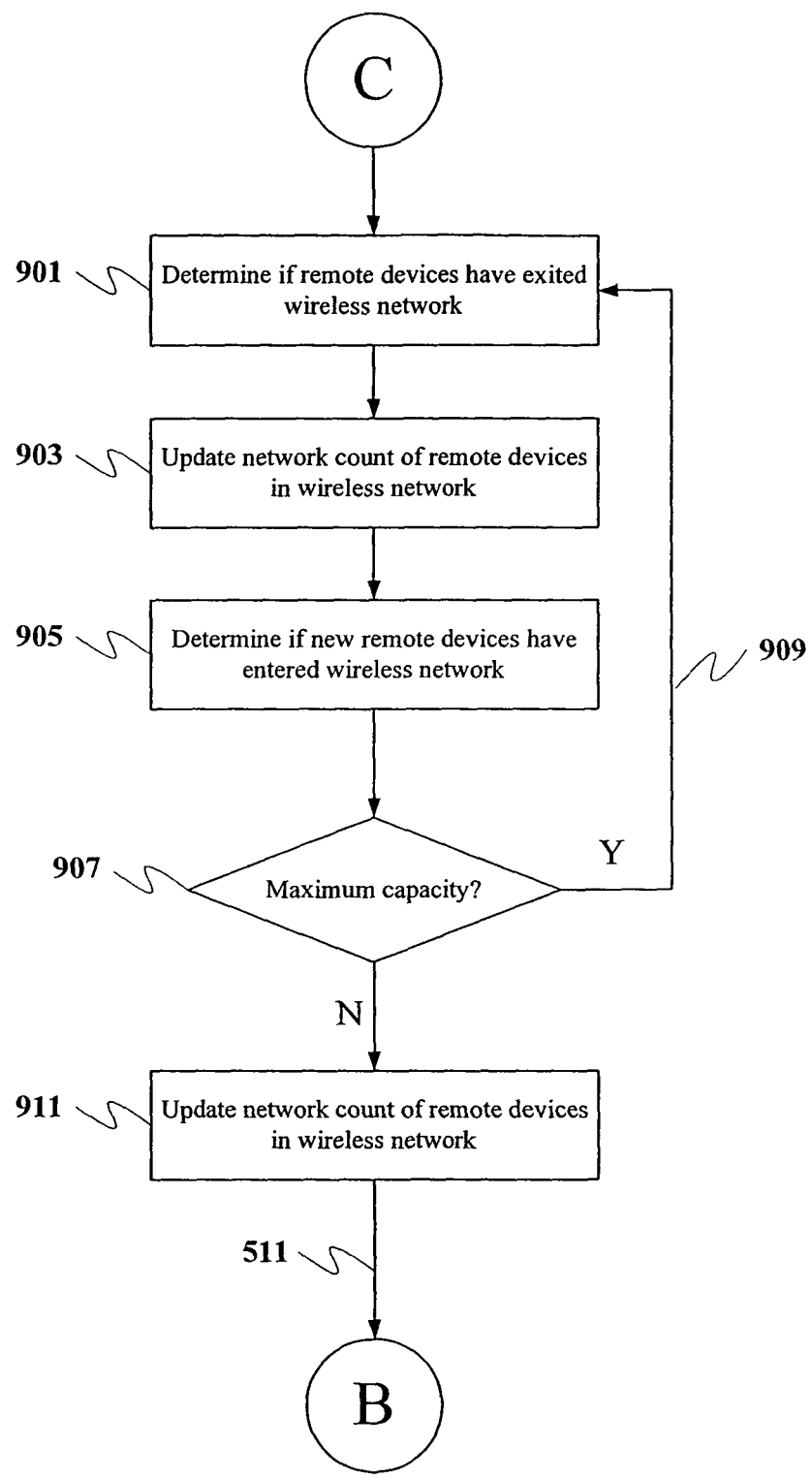

Along with the process of updating of distance information for enabled and blocked links of remote devices, the local device 405 continually updates link information as shown by connector C in FIG. 8. In a preferred embodiment of the present invention, the local device 405 may be programmed to only allow a limited number of remote devices to link up with the local device 405. As the bandwidth of the local device 405 is fixed, limitation of linked device prevents a slowdown of communications to enabled devices. Therefore, the local device 405 keeps a network count of the remote devices that are linked with the local device 405. FIG. 9 describes the process for updating the communications links of the network 400 based on the network count in accordance with the present invention.

In step 901, the local device 405 determines whether any of remote devices $410_1$, $410_2$, . . . , $410_N$ have exited the network 400 due to the user of the device turning off power to the remote device, or exiting the area in which the remote device can receive the transmit power of the local device and/or exiting the area in which the local device can receive the transmit power of the remote device. This determination may be made based on synchronization information with the remote devices or based on an exit signal transmitted from the remote device to the local device 405. In step 903, the local device 405, updates a count of remote devices on the wireless network 400 based on the determination made in step 901. If no linked remote devices have exited the network, the count remains the same, and the network count is decremented for each remote device that has left the network.

In step 905, the local device 405 determines if a new remote device has attempted to enter the network 400. This determination is made based on the unique identifiers received in the replies obtained from remote devices as discussed in FIG. 6. If a new unique identifier is found that is not linked with the local device 405, the local device determines if the network count is at maximum capacity as seen by decision block 907. If the network count is at maximum capacity, the local device 405 returns to step 901 of determining whether a remote device has exited the network 400 as seen by loop 909. Local device 405 continues in loop 909 without sending a new join message to unlinked devices until the network count is less than the maximum capacity at which time the local device will increment the network counter in accordance with the number of new remote devices that have attempted to enter the network as seen in step 911. After adding the new remote devices to the network counter, the local device executes loop 511 whereby a new join code is sent out to remote devices so that new remote devices may be able to join the network 400 as discussed in FIG. 5.

Thus, according to the embodiment of the present invention shown in FIGS. 6-9, the local device 405 automatically enables and blocks data communications with remote devices $410_1, 410_2, \ldots, 410_N$ based on the distance to each remote device $410_1, 410_2, \ldots, 410_N$. As the local device continually updates distance information for all linked devices while also searching for new remote devices to join the network, the network established according to this embodiment is a dynamic network in which communications with remote devices may be enabled with the local device 405 based on their distance to the local device 405 without the need for the user of the local device 405 to select from among a list of remote devices $410_1, 410_2, \ldots, 410_N$ as discussed in the background section above.

Figure 10:
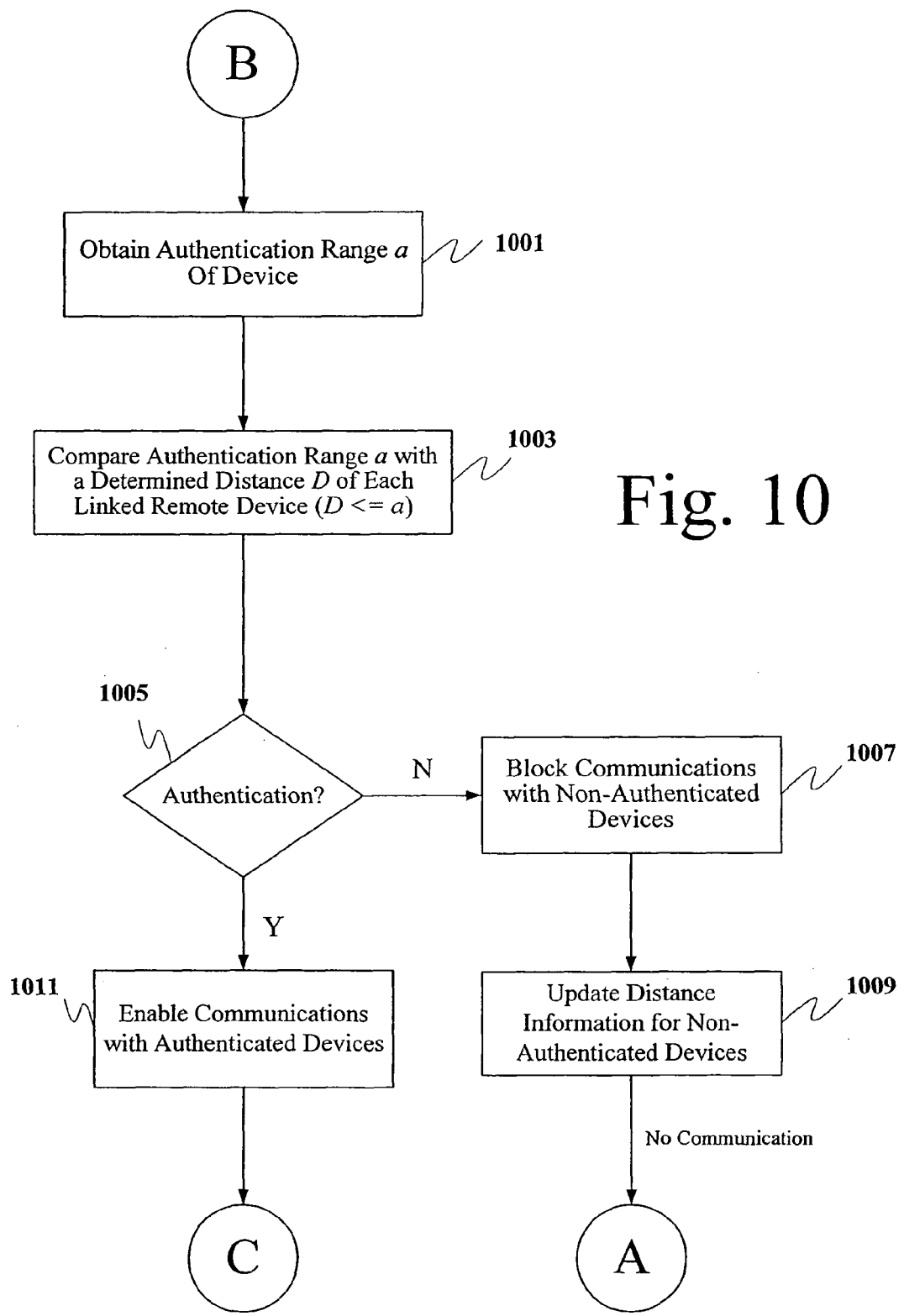
FIGS. 10 and 11 describe an alternative process for communicating with remote devices based on distance information in accordance with other preferred embodiments of the present invention.

The alternative embodiment of the present invention disclosed in FIG. 10 describes a process for authenticating communications with linked remote devices based on distance information. In step 1001, the local device 405 obtains an authentication range a of the local device. As with the range criteria r discussed above, the authentication range a is preferably programmable by the user in which case the user inputs the authentication range into the main memory 307 of the local device 405 via the input device 315 for example, but may be set by the manufacturer of the device in which case the authentication range is stored in the ROM 309 of the local device 405. According to the embodiment of FIG. 10 however, the authentication range a serves to enable, or authenticate, communications with remote devices $410_1, 410_2, \ldots, 410_N$ regardless of the distance of the authenticated remote device thereafter as will be described below.

In step 1003, the authentication range a is compared with the distance D determined for each remote device $410_1, 410_2, \ldots, 410_N$ and stored in main memory 307 as discussed with respect to step 715 above. In making this comparison, the processor 305 determines whether the distance D for a particular remote device $410_1, 410_2, \ldots, $ or $410_N$ is less than, equal, or greater than the authentication range a.

In decision block 1005, the local device 405 determines whether to authenticate remote devices $410_1, 410_2, \ldots, 410_N$ based on the comparison made in step 1003 of FIG. 10. If the results of the comparison indicate that the distance to the particular remote device $410_1, 410_2, \ldots,$ or $410_N$ is greater that the authentication range (i.e., D>a), the local device determines that the remote device $410_1, 410_2, \ldots,$ or $410_N$ cannot be authenticated and, according to the embodiment of FIG. 10, blocks communications with the non-authenticated remote device $410_1, 410_2, \ldots,$ or $410_N$ as shown in step 1007.

On the other hand, if the results of the comparison indicate that the distance to a particular remote device $410_1, 410_2, \ldots,$ or $410_N$ is less than or equal to the authentication range (i.e., D≦a), according to the embodiment of FIG. 10, communications are enabled with the authenticated remote device as shown in step 1011. For example, if the authentication range a of the local device 405 is set to be 1 foot, and at any time the first remote device $410_1$ enters within that distance to the local device 405, communications with first remote device $410_1$ will be enabled regardless of the distance of the first remote device $410_1$ thereafter. Similarly, if the second remote device $410_2$ never enters within 1 foot of the local device 405, the link $415_2$ associated with the second remote device $410_2$ will never get enabled.

As with the embodiment of FIG. 8, the local device 405 updates distance information for non-authenticated remote devices in step 1009, and if the non-authenticated device, for example the second remote device $410_2$ as indicated above, enters the authentication range of the local device 405, then the device is authenticated and the second communications link $415_2$ associated with the second remote device $410_2$ is enabled for transmitting and receiving communications.

Unlike the embodiment of FIG. 8, however, according to the embodiment of FIG. 10, distance information is not updated for authenticated devices as indicated by the connection C in FIG. 10. Rather, once a remote device $410_1, 410_2, \ldots,$ or $410_N$ is authenticated by entering within the authentication range of the local device 405, then the remote device $410_1, 410_2, \ldots,$ or $410_N$ is enabled regardless of the distance from the local device 405. Thus in the example discussed above, no distance information will be updated for the authenticated first remote device $410_1$ until the user decides to terminate the authentication of the first remote device $410_1$. This allows a greater amount of bandwidth to be used for communications to authenticated remote devices $410_1, 410_2, \ldots, 410_N$.

Thus, according to the embodiment of the present invention shown in FIGS. 6, 7, 9, and 10, the local remote device 405 authenticates communications based on the distance to each remote device $410_1, 410_2, \ldots, 410_N$. As the local device 405 enables communications with a remote device that enters an authentication range of the local device 405 and continually updates distance information for all non-authenticated remote devices $410_1, 410_2, \ldots, 410_N$ while also searching for new remote devices $410_1, 410_2, \ldots, 410_N$ to join the network, the network established according to this embodiment is a dynamic network in which communications with remote devices $410_1, 410_2, \ldots, 410_N$ may be enabled with the local device 405 based on their distance to the local device 405 without the need for the user of the local device 405 to select from among a list of remote devices $410_1, 410_2, \ldots, 410_N$ as discussed in the background section above.

According to yet another embodiment of the present invention, distance information is used to provide a positional map of remote devices $410_1, 410_2, \ldots, 410_N$ from which the user of the local device 405 can select the remote devices $410_1, 410_2, \ldots, 410_N$ for which communications links will be enabled. FIG. 11 shows a typical conference room 1100 located adjacent to rooms 1200 and 1300. The conference room 1100 has ten mobile wireless devices each of which is represented by an "X", and four fixed reference devices represented by an "R". A local mobile device within conference room 1100 is represented as a bold faced X 1001 while all remote mobile devices within conference room 1100 are represented as a non-bolded X and mobile devices within adjacent rooms 1200 and 1300 are represented by a "Y". The reference devices $R_1, R_2, R_3$, and $R_4$ are in fixed positions to provide a known reference point from which the position of each mobile device X and Y is measured. The reference devices may be fixed structure devices or mobile devices that remain stationary in conference room 1100 during conferences.

Figure 11:
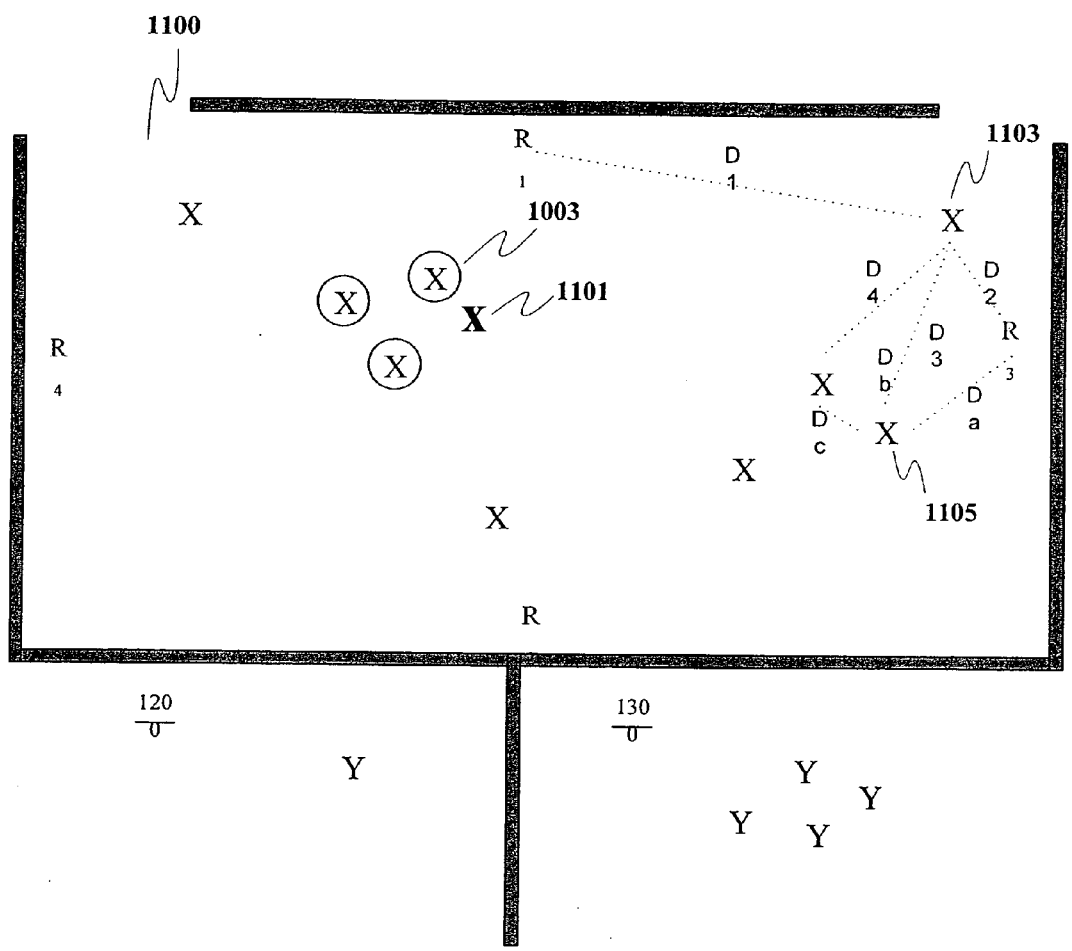

As with the network of FIG. 4, while device 1101 is referred to as a "local device" and all other devices of FIG. 11 are referred to as "remote devices", this nomenclature is for purposes of description only and it is to be understood that the embodiment shown in FIG. 11 is not limited to an access point system and may be implemented in an ad hoc system wherein any device in the network can act as a master and/or a slave device. Also as with the devices of FIG. 4, local device 1101 and each remote device X, Y and R preferably includes a processor system, such as the one described in FIG. 3, for inputting, storing, and processing data in accordance with the present invention and a UWB transceiver that transmits and receives a UWB signal which includes data for communicating with remote devices based on distance in accordance with the present invention.

Additionally, each wireless device shown in FIG. 11 preferably includes a compass used for orienting the display 313 of the local device 1101. In this regard, the reference devices $R_1, R_2, R_3$, and $R_4$ are preferably located due north, south east and west and west of a center point of the conference room 1100, as seen by the directional arrows of FIG. 11, so that the display 313 of the local device 1101 can be oriented in accordance with the direction in which the user of the local device is facing as will be discussed.

According to the embodiment related to FIG. 11, and with reference to FIG. 3, the display 313 of the processor system 301 of local device 1101 displays a graphical map of the position of each remote device in conference room 1100 from which the user of the local device may choose remote devices to enable communications with. Thus the display 313 appears as a top view of the conference room 1100 with each device physically located in the conference room having a corresponding position on the display 313 of the local device 1101. In making a selection, the user of local device 1101 looks at the display 313 and associates the devices on the display with remote device users visually verified by the local user.

In a preferred embodiment, the reference marker that the local user is facing always appears at the top of the display 313 so that the local user can easily associate the physical location of a device with the corresponding screen location.

Figure 12:
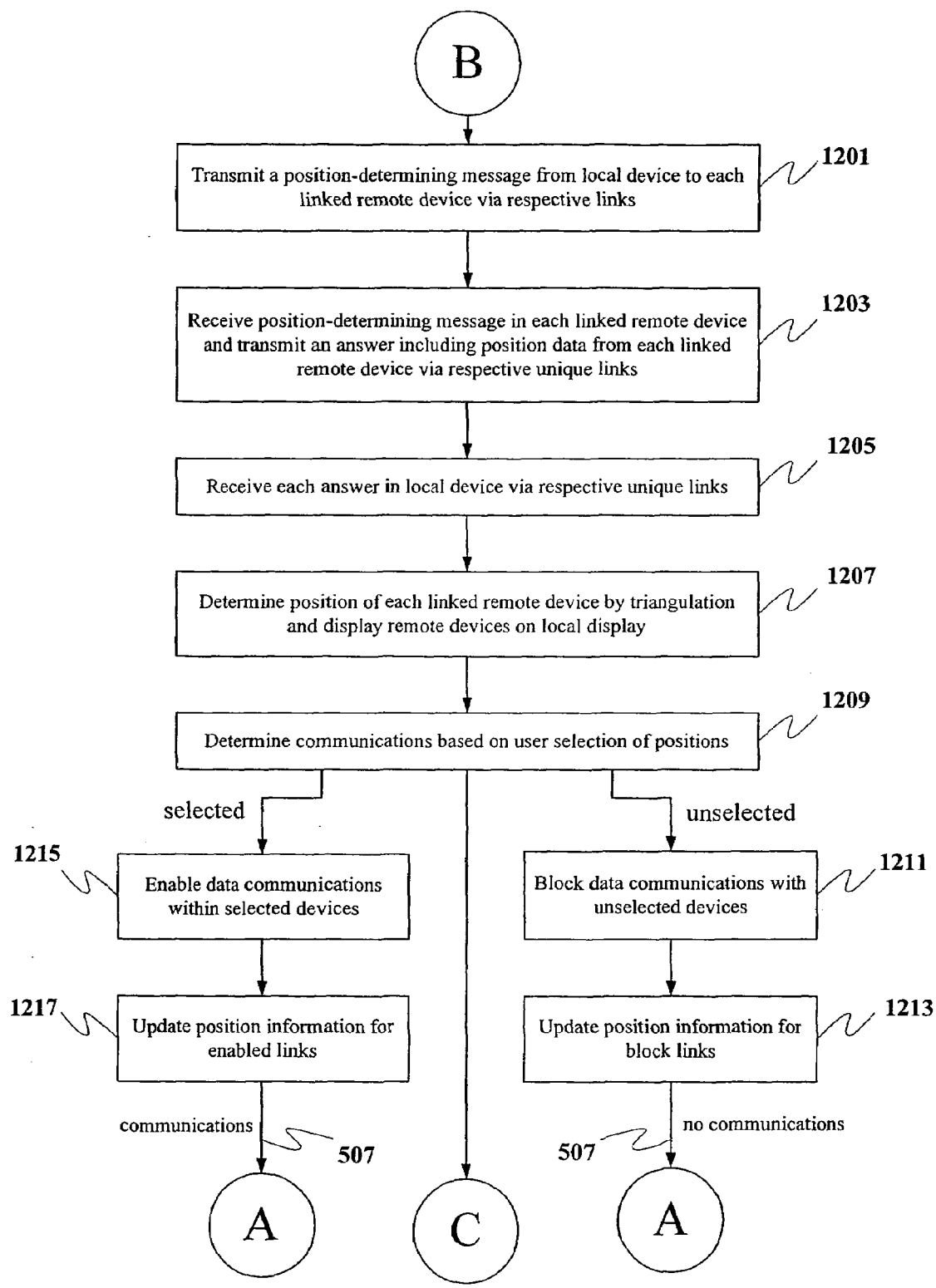
FIG. 12 describes a process for providing secured communications with remote devices according to a preferred embodiment of the present invention.

FIG. 12 shows a process for enabling and disabling communication with remote devices based on selections made on a positional map obtained from distance information in accordance with the present invention. In this embodiment, the local device 1101 establishes a unique link with each remote device, including mobile devices X, reference devices $R_1$-$R_4$, and mobile devices Y as described in FIG. 6, and determines distance to each remote device as described in FIG. 7.

In step 1201, the local device 1101 transmits a position-determining message to all linked remote devices X, R, and Y via the unique links established with each device. The position-determining message may be a simple UWB signal that indicates that the local device 1101 is requesting the data necessary to determine position information from each linked remote device. Alternatively, as with the distance determining message discussed above, the position determining message may be included in a communication to devices previously enabled by the local device 1101.

In step 1203, each of the linked remote devices receives the position-determining message and transmits an answer to the local device 1101 via a respective communication link. In this step, each of the linked remote devices encodes position information obtained by the remote device and includes the position information in the answer transmitted. The position information includes the distance from the answering remote device to each other remote device X, R, and Y. For example, referring to FIG. 11, mobile device 1103 will have a continually updated database of the distance from itself to reference device $R_1$, to reference device $R_3$, to device 1105, and each other device as indicated by dashed lines $D_1$-$D_4$ of FIG. 11. Similarly, device 1105 will have a continually updated database of the distance from itself to each other device as shown by dashed lines $D_a$-$D_c$ of FIG. 11.

In step 1203 of FIG. 12, devices 1103 and 1105 encode this position information and transmit it as part of the answer to local device 1101. According to a preferred embodiment, the position information may include distance from the answering remote device to a limited number of remote devices when the number of remote devices in the listening range of the local device 1101 is large. Moreover, remote devices may cooperate with one another to ensure that duplicate distance information (such as distance $D_3$ and $D_b$) is not transmitted to local device 1101 more than once. These features reduce the amount of data to be processed by processor 305 of the local device 1101 and therefore increases the speed at which the local device 1101 can display positional updates on the display 313.

In addition to this positional information, the answer of the reference devices $R_1$ through $R_4$ includes data identifying the reference device as a reference device as well as the unique position of the reference device. For example, reference device $R_1$ of FIG. 11 would encode data indicating that the position of $R_1$ is on the north wall of the conference room 1100. According to one embodiment, this information is input into the reference devices $R_1$-$R_4$ by a user when the conference room 1100 is set up for positional capabilities. This data allows a particular reference device to be placed at the top of the display 313 when a compass of the local device indicates that the local user is facing the reference device as will be discussed.

In step 1205, the local device 1101 receives the answer from each remote device including the reference devices $R_1$-$R_4$, devices X and devices Y, and decodes the positional information of each remote device and stores the distances of the positional information in main memory 307. From the stored distance information, processor 305 of device 1101 determines the position of each device using a triangulation process as seen in step 1207. All positions are then displayed on the display 313 of the local device 1101 so that the user of the local device can associate each remote device on the screen with a remote device physically located in the conference room 1100.

According to a preferred embodiment, the local device 1101 uses triangulation information to determine which remote devices are outside a boundary formed by reference devices $R_1$-$R_4$ and uses this information to display only those devices within the boundary. Thus, according to this embodiment, the local device 1101, identifies the remote devices Y located in rooms 1200 and 1300 of FIG. 11 and does not display these devices on the display 313 of the local device 1101.

With the remote devices located within conference room 1100 displayed on the display 313 of the local device 1101, the user enables communications with a remote device viewed in physical space of the conference room 1100 by selecting a corresponding position on the display in order to, as shown in step 1209. According to one embodiment, the display 313 has touch screen capabilities that allow the user to select a remote device by contacting the display with a pointing device, for example. If the user of the local device 1101 selects a position located on the display of the local device, then the local device 1001 enables communications with that device as shown in step 1215.

As with other embodiments, positional information on enabled links is updated as shown in step 1217 and loop 507 of FIG. 12. If the user does not select a position on the display screen, the communications link associated with the unselected device is blocked from data communications as in step 1211 and positional information for blocked links is updated in step 1213. Also, as with other embodiments, the local device 1101 periodically looks for new devices and updates communications links as shown by connection C FIG. 12.

According to a preferred embodiment, display 313 indicates which remote devices are enabled as positional information is updated in steps 1213 and 1217. Thus, as seen in FIG. 11, remote devices for which communications are enabled may be indicated by circling the remote devices. As the remote devices X move around conference room 1100, the user of local device 1101 can keep track of which devices communications are enabled for by viewing the circled Xs on display 313.

Thus, according to the embodiment of the present invention shown in FIGS. 6, 7, 9, and 12, the local device 1101 displays a graphical map of the position of remote devices in relation to the local device and enables communications based on local user's selection of a remote device on the map. As the positions are determined based on positional data that includes distances between the remote devices, devices may be enabled with the local device based on their distance to the local device 1101 without the need for the user of the local device 1101 selecting from among a list of remote devices as discussed in the background section above.

According to a preferred embodiment of the present invention, communications links enabled by any of the processes described may be a secure communications using encryption methods such as the methods described in the text entitled HOW THE INTERNET WORKS, Millennium Edition, Preston Gralla, Macmillan Computer Publishing, Indianapolis 1999, the contents of which are incorporated by reference in their entirety.

Figure 13:
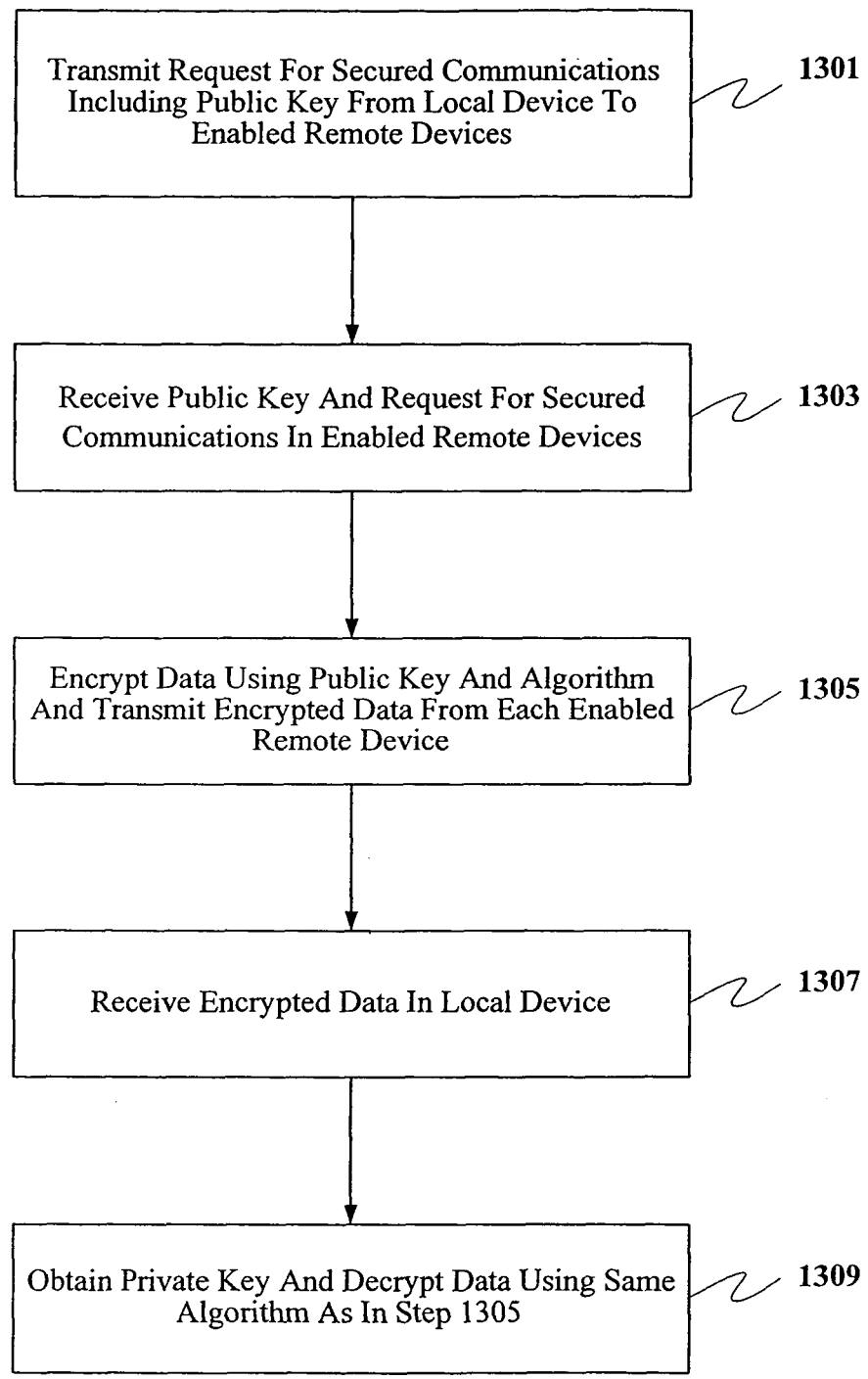
FIG. 13 is a flow chart that describes an exemplary process for providing a secured communications link using public key cryptography in accordance with a preferred embodiment of the present invention.

FIG. 13 describes an exemplary process for providing a secured communications link using public key cryptography in accordance with a preferred embodiment of the present invention. In step 1301, the local device 1001 transmits a request for secured communications to enabled remote devices. The request includes the public key of the local device requesting the secured communications. The public key is a key that is shared with any remote device and is used by the remote device to encrypt a data communication intended for the local device.

In step 1303, the enabled remote devices receive the request for secured communications and the public key of the local device. Each enabled remote device then decodes the public key in step 1305 and uses the public key to encrypt any message that the remote device intends for the local device in step 1307. As seen in step 1307, encryption is accomplished by applying the public key of the local device and the message to any one of a variety of known encryption algorithms. The encrypted message is then transmitted from the enabled remote device to the local device.

In step 1307, the local device receives the encrypted message that is unintelligible. Any device that may intercept the encrypted message will not be able to decrypt the message even if the intercepting device has the public key of the local device because a private key that only the local device has is needed to decrypt the unintelligible message.

In step 1309, the local device obtains its private key from memory and decrypts the encrypted message using the private key. Thus, secure communications can be provided for any one of the discussed embodiments for enabling communications based on distance information described above. In addition, it is to be understood that methods of guaranteeing the source of a particular message, such as digital certificates and other means of authentication may also be applied to the present invention.

Figure 14:
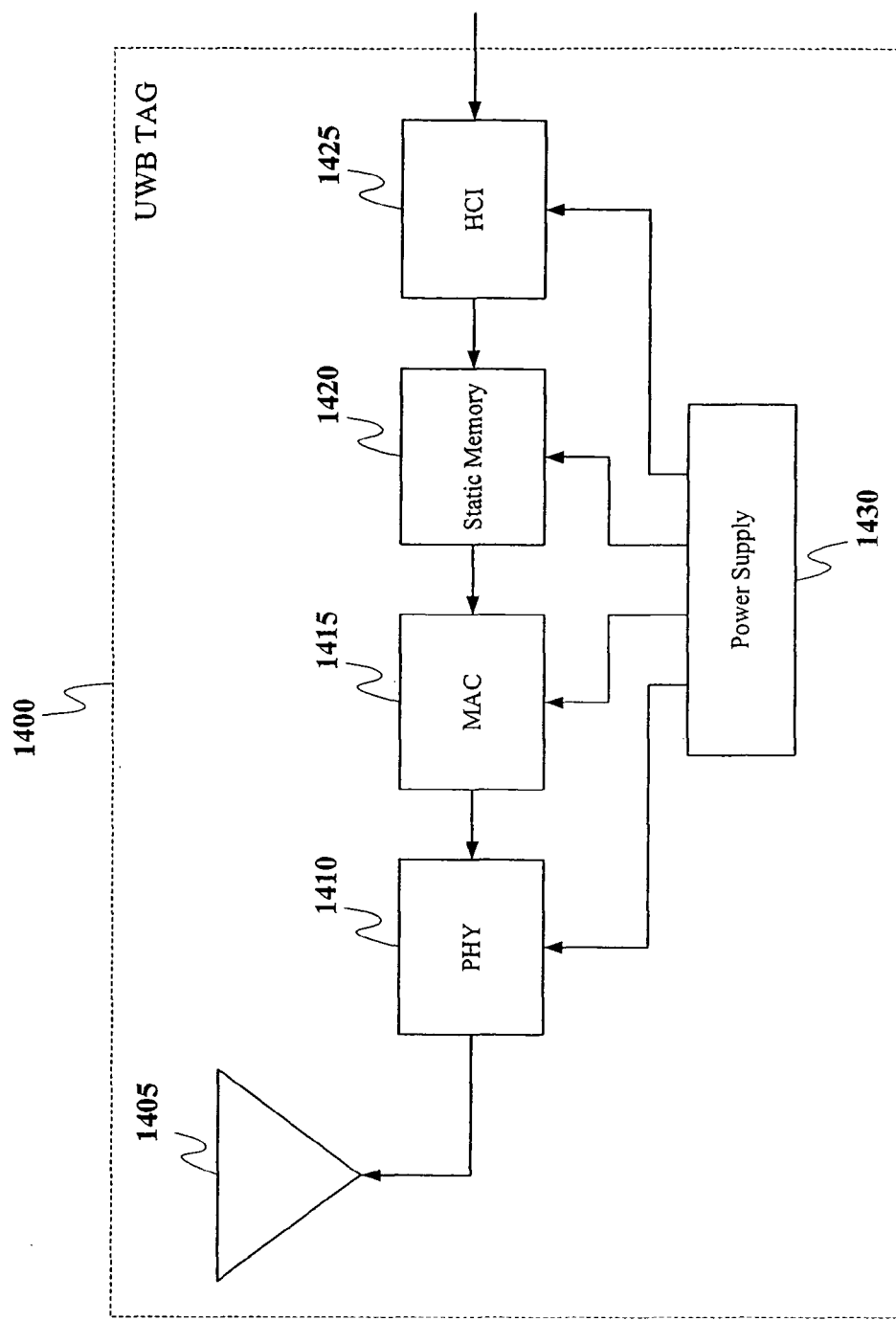
FIG. 14 is a block diagram of a remote device according to a preferred embodiment of the present invention.
Figure 15:
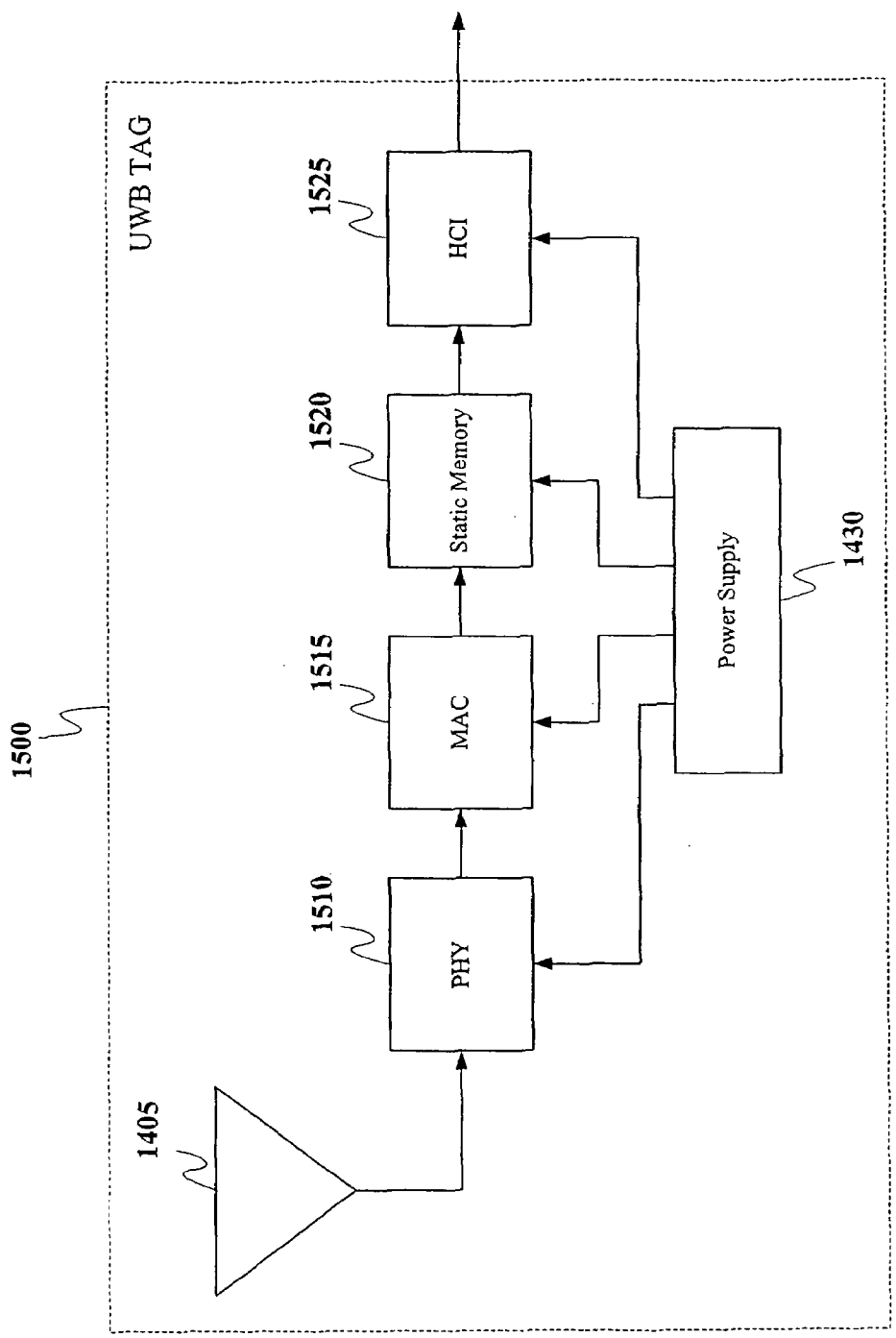
FIG. 15 is a block diagram of a remote device according to another preferred embodiment of the present invention.
Figure 16:
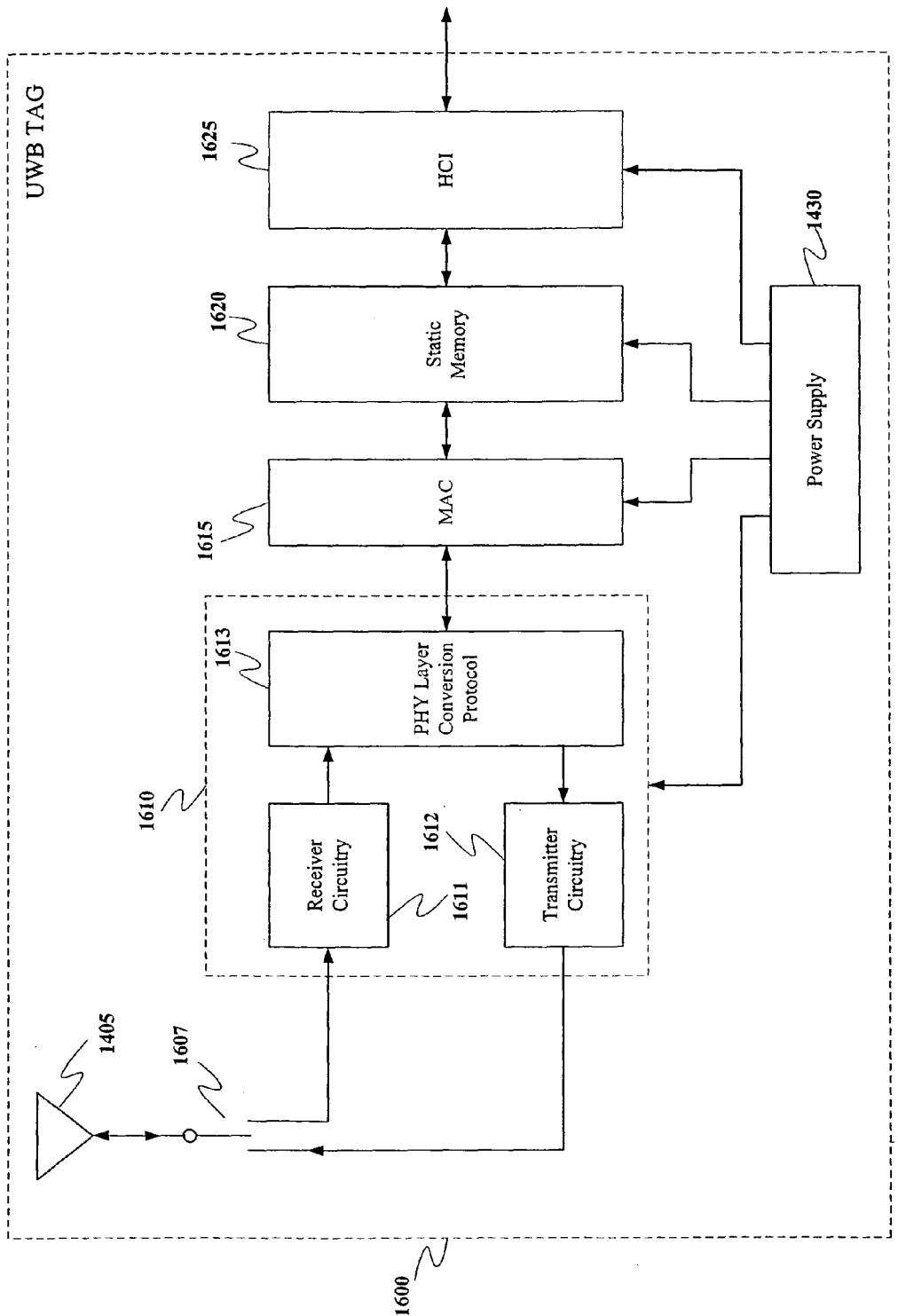
FIG. 16 is a block diagram of a remote device according to yet another preferred embodiment of the present invention.

FIGS. 14 to 16 show the remote devices $410_1, \ldots, 410_N$ according to preferred embodiments of the present invention. In particular, FIG. 14 shows a UWB tag 1400 configured as a transmitter; FIG. 15 shows a UWB tag 1500 configured as a receiver; and FIG. 16 shows a UWB tag 1600 configured as a transceiver.

As shown in FIG. 14, the UWB tag 1400 used for transmitting includes an antenna 1405, a physical layer (PHY) 1410, a media access controller (MAC) 1415, a memory 1420, a host controller interface (HCI) 1425, and a power supply 1430. In the UWB tag 1400, the various elements operate as follows.

The antenna 1405 transmits a UWB signal as provided to it from the PHY 1410, which prepares the signal for transmission in a manner similar to that disclosed above for the RF PMD 120 and the digital PMD 130 shown in FIG. 1. In an embodiment where the UWB tag 1400 acts only as a transmitter, the PHY 1410 can be reduced in complication as compared to the RF PMD 120 and the digital PMD 130 by eliminating all circuitry relating to receiving functions. Furthermore, if only a limited kind of signal will need to be transmitted, the PHY 1410 may be further simplified such that it only supports that limited type of signal.

The MAC 1415 serves as the interface between the UWB wireless communication functions implemented by the PHY 1410 and the data contained in the memory 1420. The MAC 1415 essentially translates the data stored in the memory 1420 into a format that the PHY 1410 can transmit via the antenna 1405. Given the limited functions that must be performed by the MAC 1415, it is significantly reduced in complexity as compared to the MAC 150 shown in FIG. 1. In alternate embodiments the MAC 1415 could be eliminated altogether and the memory 1420 could be loaded with data already in the proper form for the PHY 1410 to use.

The memory 1420 holds the information that will be transmitted by the UWB tag 1400. For example, it may include tag ID data, date of placement of the tag, information about what the tag is associated with (person, product, shipment, etc.), or any other desirable information. In the preferred embodiment memory 1420 is a static memory device, such as an EPROM, EEPROM, etc.

The HCI 1425 serves as an interface for providing data to the memory 1420 from an external source. It could connect to a bar code reader if the tag 1400 includes simple identification information, a computer output if it receives more complicated information, an internal processor if the tag 1400 is contiguous with a remote device such as a PDA, etc.

In alternate embodiments where the data in the memory 1420 need not be changed during the lifetime of the UWB tag (e.g., an identification tag), the memory 1420 may be a read-only memory and the HCI 1425 may be eliminated.

The power supply 1430 provides the necessary power required to operate the elements of the UWB tag 1400. It is preferably a battery power source that is configured in a fashion to extend its lifetime as long as possible. However, alternate sources may be used provided they could meet power and functional lifetime requirements.

As shown in FIG. 15, the UWB tag 1500 for receiving includes an antenna 1405, a physical layer (PHY) 1510, a media access controller (MAC) 1515, a memory 1520, a host controller interface (HCI) 1525, and a power supply 1430. In the UWB tag 1500 the various elements operate as follows.

The antenna 1405 receives a UWB signal, transforms it into an electrical or optical signal, and as provides to it from the PHY 1510, which demodulates the signal and extracts the data from it in a manner similar to that disclosed above for the RF PMD 120 and the digital PMD 130 shown in FIG. 1. In an embodiment where the UWB tag 1500 acts only as a receiver, the PHY 1510 can be reduced in complication as compared to the RF PMD 120 and the digital PMD 130 by eliminating all circuitry relating to transmitting functions. Furthermore, if only a limited kind of signal will need to be received, the PHY 1510 may be further simplified such that it only supports that limited type of signal.

The MAC 1515 serves as the interface between the UWB wireless communication functions implemented by the PHY 1410 and the data used by the memory 1520 and HCI 1525. The MAC 1515 essentially translates the data received from the PHY 1510 into a format that the memory 1520 or HCI 1525 can use. Given the limited functions that must be performed by the MAC 1515, it is significantly reduced in complexity as compared to the MAC 150 shown in FIG. 1. In alternate embodiments the MAC 1515 could be eliminated altogether and the memory 1520 or the HCI 1525 can receive and use the data in form received from the PHY 1510.

The memory 1520 holds information received by the UWB tag 1500. For example, it may include local or remote device ID data, operator ID, time or date information, operational instructions, or any other desirable information. In the preferred embodiment memory 1520 may be any desirable static memory device, such as an EPROM, EEPROM, etc.

The HCI 1525 serves as an interface for taking data from the memory 1520 and providing it to an outside device (not shown). This outside device could be a PDA, a computer, a display device, or the like. The HCI 1525 could include timing, data conversion functions, or the like, as necessary.

In alternate embodiments where the information received by the UWB tag 1500 may be sent directly to the outside device, e.g., to sound an alarm or change a display, the memory 1520 can be eliminated. In embodiments where the data can be used unchanged, it may also be possible to eliminate the HCI 1525 and send information directly from the MAC 1515 to an outside device.

The power supply 1530 provides the necessary power required to operate the elements of the UWB tag 1500. It is preferably a battery power source that is configured in a fashion to extend its lifetime as long as possible. However alternate sources may be used provided they meet required power and functional lifetime requirements.

As shown in FIG. 16, the UWB tag 1600 for transmitting or receiving includes an antenna 1405, a switch 1607, a physical layer (PHY) 1610, a media access controller (MAC) 1615, a memory 1620, a host controller interface (HCI) 1625, and a power supply 1430. The PHY 1610 further includes receiver circuitry 1611, transmitter circuitry 1612, and a PHY later conversion protocol (PLCP) 1613. In the UWB tag 1400, the various elements operate as follows.

The antenna 1405 operates to transmit or receive a UWB signal depending upon whether it is in a transmit or receive mode. In either case, the PHY layer conversion protocol 1613 performs a function similar to the PHY layer conversion protocol 140 in FIG. 1.

In a receive mode, the switch 1607 connects the antenna 1405 to the receiver circuitry 1611. The PHY 1610 then handles the receipt of the incoming signal in a manner similar to that disclosed above for the RF PMD 120 and the digital PMD 130 shown in FIG. 1 with the receiver circuitry 1611 including the functions of the receiver front end 122, demodulator 124, and receiver baseband 134. In an embodiment where only a limited kind of signal will need to be received, the receiver circuitry 1611 may be simplified such that it only supports that limited type of signal.

In a transmit mode, the switch 1607 connects the antenna 1405 to the transmitter circuitry 1612. The PHY 1610 then prepares the signal for transmission in a manner similar to that disclosed above for the RF PMD 120 and the digital PMD 130 shown in FIG. 1, with the transmitter circuitry 1612 including the functions of the transmitter front end 126, modulator 128, and transmitter baseband 134. In an embodiment where only a limited kind of signal will need to be transmitted, the transmitter circuitry 1612 may be simplified such that it only supports that limited type of signal.

The MAC 1615 serves as the interface between the UWB wireless communication functions implemented by the PHY 1610 and the data contained in the memory 1620. It preferably operates as shown above for the MAC 1415 in FIG. 14 and the MAC 1515 in FIG. 15. Although the MAC 1615 has more functions than either the MACs 1415 or 1515, it is still reduced in complexity as compared to the MAC 150 shown in FIG. 1. In alternate embodiments the MAC 1615 could be eliminated altogether and the memory 1620 could be loaded with data already in the proper form for the PHY 1610 to use, and data could be sent on to an outside device without storing it.

The memory 1620 holds the information that will be transmitted by the UWB tag 1600 or holds information received by the UWB tag 1600. In the preferred embodiment memory 1620 is a static memory device, such as an EPROM, EEPROM, etc.

The HCI 1625 serves as an interface between the memory 1620 and any outside devices, as shown above for the HCI 1425 of FIG. 14 or the HCI 1525 of FIG. 15.

In alternate embodiments where the data in the memory 1620 need not be changed during the lifetime of the UWB tag (e.g., an identification tag), and no incoming data need be stored, the memory 1620 may be a read-only memory and the HCI 1625 may be eliminated.

The power supply 1430 provides the necessary power required to operate the elements of the UWB tag 1600. It is preferably a battery power source that is configured in a fashion to extend its lifetime as long as possible. However alternate sources may be used provided that they can meet power and functional lifetime requirements.

One limitation of each of these designs that operates as a receiver is that they require either constant or periodic operation to monitor for incoming signals. These operations occur regardless of data traffic. This can have a detrimental effect on the power supply for the device.

In an effort to correct this problem and to extend the life of the power supply in a UWB tag, the current inventor proposes the use of both UWB and RF tags on the same device. FIGS. 17 to 21 are block diagrams showing various embodiments of this aspect of the invention.

Figure 17:
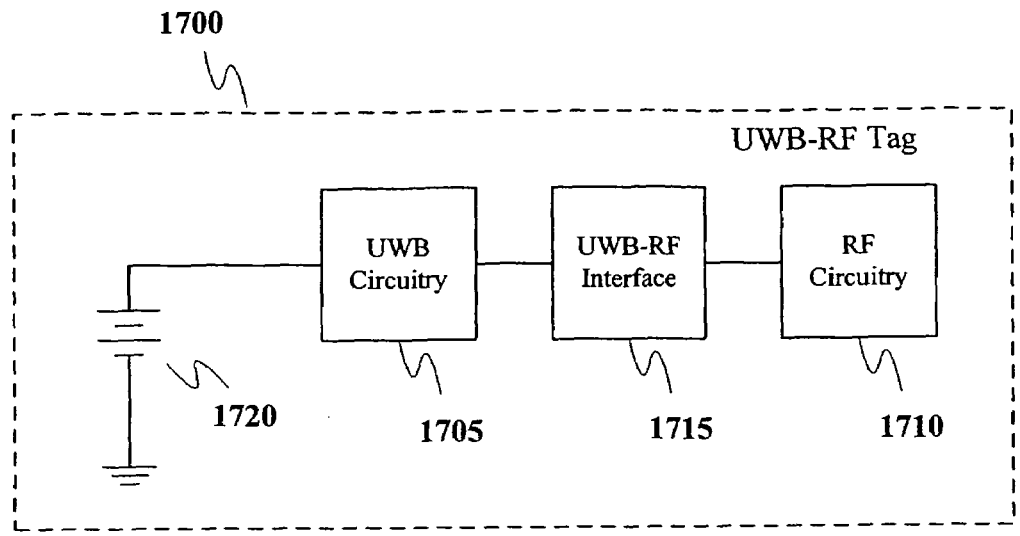
FIG. 17 is a block diagram showing a combined UWB-RF tag according to a first preferred embodiment.

FIG. 17 shows a combined UWB-RF tag according to a first preferred embodiment of the present invention. As shown in FIG. 17, the UWB-RF tag 1700 includes UWB circuitry 1705, RF circuitry 1710, a UWB-RF interface 1715, and a power supply 1720.

The UWB circuitry 1705 is preferably of the sort described above with respect to FIGS. 14 to 16. The RF circuitry 1710 is preferably of a kind generally known, such as that shown, for example, in U.S. Pat. No. 6,107,910 to Nysen.

The UWB-RF interface 1715 connects the UWB circuitry 1705 with the RF circuitry 1710. The power supply 1720 provides power to the UWB circuitry (and to the RF circuitry 1710 and UWB-RF interface 1715, if necessary). It is preferably chosen to have characteristics that will maximize its effective lifetime given the operational requirements of the UWB-RF tag 1700.

In this design, the functions of an ID tag are shared between the UWB circuitry 1705 and the RF circuitry 1710. For example, the UWB circuitry 1705 could handle the transmission of data and the RF circuitry 1710 could handle the reception of data; the RF circuitry 1710 could be used for initial contact with a local device (as shown in FIG. 4) and the UWB circuitry 1705 could be used for all other contact; the RF circuitry 1710 could be used generally with the UWB circuitry 1705 being used only when interference was too great; or any other desirable configuration could be used.

The UWB-RF interface 1715 need only be as complicated as necessary, and may be as simple as a signal line, or may even be eliminated altogether if the functions of the two elements can be performed without direct contact. However, in alternate embodiments the UWB-RF interface 1715 could perform more complicated operations and may include more complicated logic such as an ASIC, a CPU, or the like.

Figure 18:
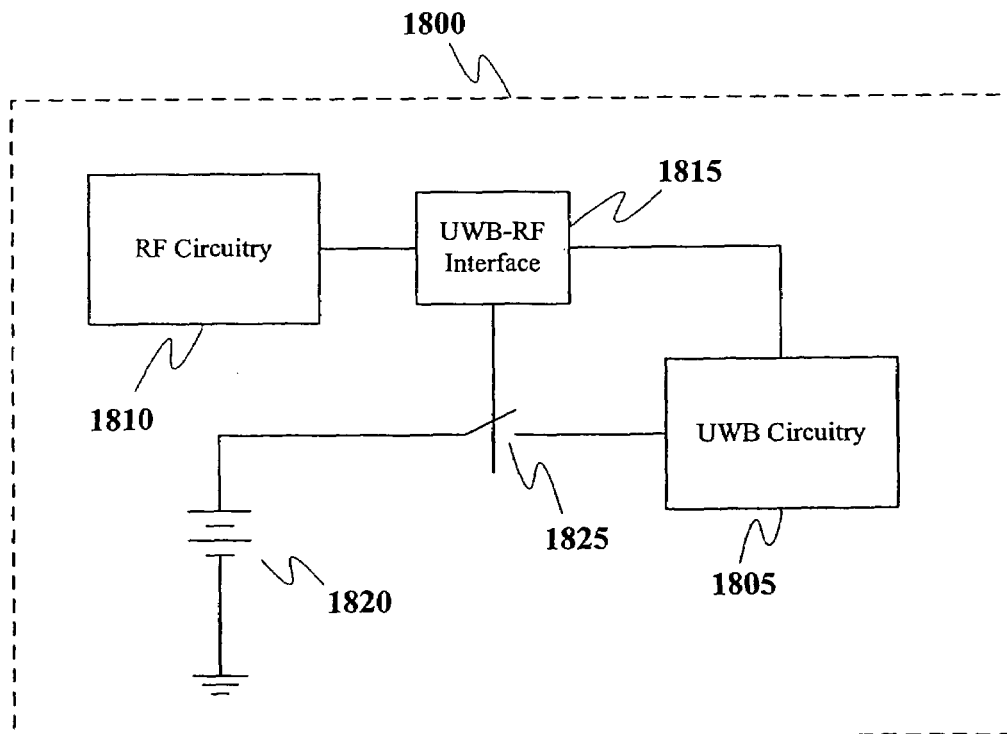
FIG. 18 is a block diagram showing a combined UWB-RF tag according to a second preferred embodiment.

FIG. 18 shows a combined UWB-RF tag according to a second preferred embodiment of the present invention. As shown in FIG. 18, the UWB-RF tag 1800 includes UWB circuitry 1805, RF circuitry 1810, a UWB-RF interface 1815, a power supply 1820, and a switch 1825 connected between the UWB circuitry 1805 and the power supply 1820. As above, the UWB circuitry 1805 is preferably of the sort described above with respect to FIGS. 14 to 16, while the RF circuitry 1810 is preferably of a kind generally known.

The RF circuitry 1810 in this embodiment is preferably of a sort that is run on RF power and does not require its own separate power supply. This is accomplished by using transmitted RF signals to charge a capacitor (not shown) in the RF circuitry 1810. The charge on the capacitor is then used to run the RF circuitry 1810 and is maintained by the transmitted RF signals.

The RF circuitry 1810 is then used to turn on the UWB circuitry 1805 by passing the UWB-RF interface 1815 a signal that is used to operate the switch 1825 that connects the UWB circuitry 1805 to the power supply 1820. In the current embodiment a signal is simply passed through the UWB-RF interface 1815 from the RF circuitry 1810 to control the switch 1825. However, in alternate embodiments a more complicated operation may be performed on the signal from the RF circuitry to determine whether the switch 1825 should be opened or closed.

Since the RF circuitry 1810 in this embodiment operates on RF power and so does not require it's own separate power source, the RF circuitry 1810 can be operated continually without any negative impact on the life of the power supply 1820 for the UWB-RF tag 1800. The UWB circuitry 1805 is thus turned on only when it is needed, and so minimizes its power consumption.

In operation, a local device (See element 405 in FIG. 4) will send a message to the UWB-RF tag 1800 using RF signals. The RF circuitry 1810 will receive the signals, charge up, and then close the switch 1825, connecting the UWB circuitry 1805 to the power supply 1820. This will cause the UWB circuitry 1805 to power up, at which point it can perform whatever function is needed based on the design of the system.

In this embodiment the UWB circuitry 1805 will send to the local device a set of identification information. However, in alternate embodiments this can be a different or more complicated operation. For example, the RF circuitry 1810 could receive information from the local device regarding what function the UWB circuitry 1805 should perform. This information could then be passed on to the UWB circuitry 1805 through the UWB-RF interface 1815, and the function performed by the UWB circuitry 1805.

Once the UWB circuitry 1805 has completed its operation, the switch 1825 will be opened, shutting off the UWB circuitry 1805 by disconnecting it from the power supply 1820 until the RF circuitry 1810 again connects it. In this way the UWB circuitry 1805 will not deplete the power supply 1820 except when it is specifically performing functions requested by a local device.

This embodiment is advantageous because the RF circuitry 1810 is used to detect a request for information from the tag 1800, while the UWB circuitry 1805 is used act on that request. By using the RF circuitry 1810 to continually monitor for requests from a central local device the tag 1800 gains the advantage of low power consumption. And since the local device may well have fewer power restrictions (e.g., it may be plugged into a wall socket rather than operating on battery power), it can send out a stronger signal that can be more easily picked up by the RF circuitry 1810.

But by using the UWB circuitry 1805 for data transmission the device realizes the advantages in high data rate transmission at low power consumption at the tag end, as well as good UWB performance through cluttered environments. In other words, the combined UWB-RF tag 1800 gets the primary advantages of RF and UWB tags while avoiding the primary disadvantages of each.

This combined UWB-RF tag 1800 can also be easy to design. In its simplest form a conventionally-available RF tag can be connected as the control of a switch on a UWB tag. In this way the combined tag can be made more easily and cheaply without the need to redesign either the UWB circuitry 1805 or the RF circuitry 1810.

Figure 19:
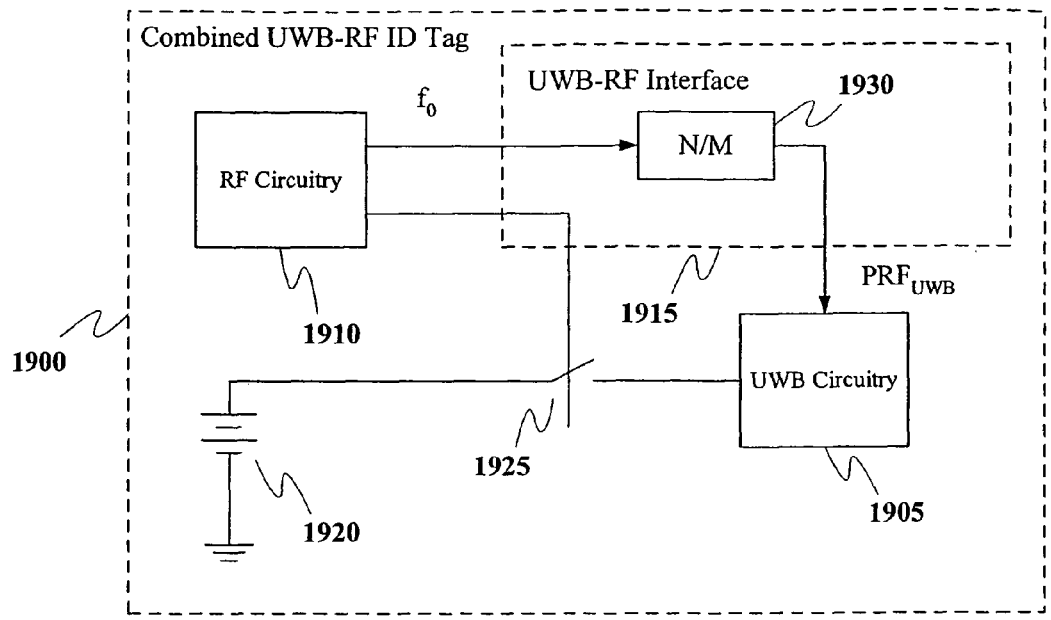
FIG. 19 is a block diagram showing a combined UWB-RF tag according to a third preferred embodiment.

FIG. 19 shows a combined UWB-RF tag according to a third preferred embodiment of the present invention. As shown in FIG. 19, the UWB-RF tag 1900 includes UWB circuitry 1905, RF circuitry 1910, a UWB-RF interface 1915, a power supply 1920, and a switch 1925 connected between the UWB circuitry 1905 and the power supply 1920. The UWB-RF interface 1915 further includes a first frequency scaler 1930. The UWB circuitry 1905 is preferably of the sort described above with respect to FIGS. 14 to 16, while the RF circuitry 1910 is preferably of a kind generally known.

The UWB-RF tag 1900 of FIG. 19 operates exactly like the UWB-RF tag 1800 in FIG. 18, except for the inclusion of the first frequency scaler 1930. In this embodiment, elements whose last two digits correspond to elements from FIG. 18 perform functions similar to those in the second preferred embodiment.

The first frequency scaler 1930 is formed in the UWB-RF interface 1915 between the UWB circuitry 1905 and the RF circuitry 1910. It receives the signal frequency $f_0$ of the RF signal received by the RF circuitry 1910 and scales it by a first scaling factor N/M. The scaled frequency is then used by the UWB circuitry 1905 to set the pulse repetition frequency for UWB operation $PRF_{UWB}$, such that:

$$PRF_{UWB} = \frac{N}{M} \cdot f_0. \tag{5}$$

The first scaling factor N/M is determined by dividing an integer N by an integer M. In embodiments where N=1, the first scaling factor can be reduced to 1/M; and in embodiments where M=1, the first scaling factor can be reduced to N. In embodiments where N=M=1, the first scaling factor becomes 1 and the first frequency scaler 1930 can be eliminated.

In alternate embodiments the switch 1925 could also be eliminated. In this case the RF circuitry 1910 may simply provide the signal frequency $f_0$, or may perform some additional function.

Figure 20:
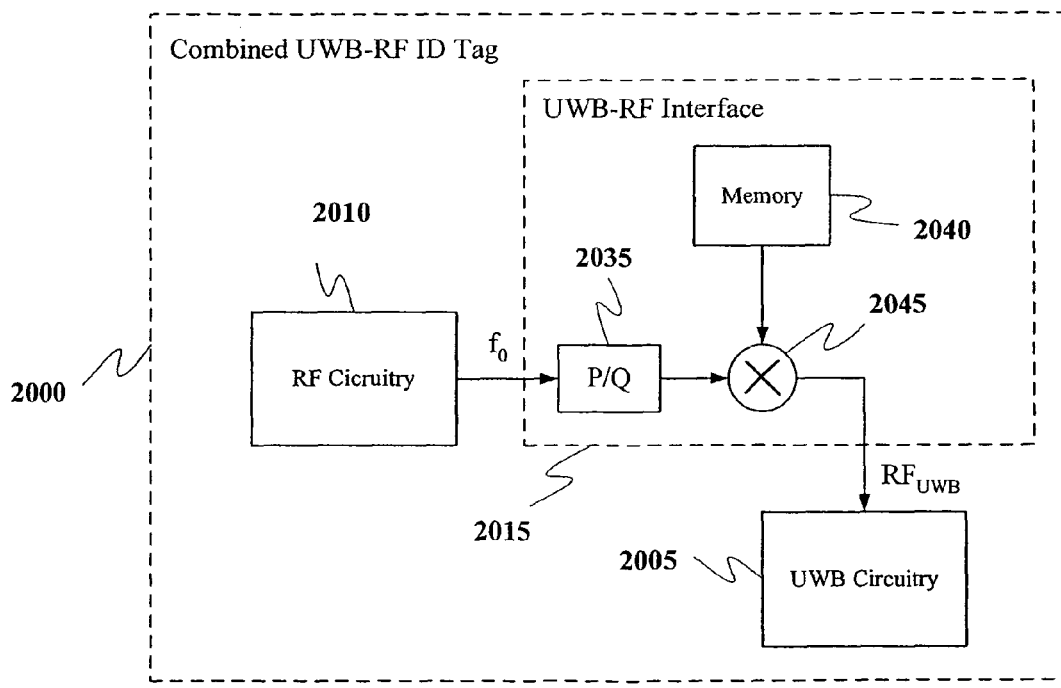
FIG. 20 is a block diagram showing a combined UWB-RF tag according to a fourth preferred embodiment.

FIG. 20 shows a combined UWB-RF tag according to a fourth preferred embodiment of the present invention. As shown in FIG. 20, the UWB-RF tag 2000 includes UWB circuitry 2005, RF circuitry 2010, and a UWB-RF interface 2015. The UWB-RF interface 2015 further includes a second frequency scaler 2035, a memory 2040, and a mixer 2045. The main UWB circuitry 2030 is preferably of the sort described above with respect to FIGS. 14 to 16, while the RF circuitry 2010 is preferably of a kind generally known.

The UWB-RF tag 2000 of FIG. 20 operates exactly like the UWB-RF tag 1700 in FIG. 17, except for the inclusion of the second frequency scaler 2035. In this embodiment elements whose last two digits correspond to elements from FIG. 17 perform functions similar to those in the first preferred embodiment.

The second frequency scaler 2035 is connected between the RF circuitry 2010 and the mixer 2045. It receives the signal frequency $f_0$ of the RF signal received by the RF circuitry 2010 and scales it by a second scaling factor P/Q.

The second scaling factor P/Q is determined by dividing an integer P by an integer Q. In embodiments where P=1, the second scaling factor can be reduced to 1/Q; and in embodiments where Q=1, the second scaling factor can be reduced to P. In embodiments where P=Q=1, the second scaling factor becomes 1 and the second frequency scaler 2035 can be eliminated.

The scaled frequency is then combined in the mixer 2045 with a signal received from the memory 2040. The memory 2040 provides a data signal that is used to form the incoming UWB radio frequency signal $RF_{UWB}$ for the UWB circuitry out of the incoming radio frequency RF signal received by the RF circuitry 2045.

Figures 24A, 24B, 24C:
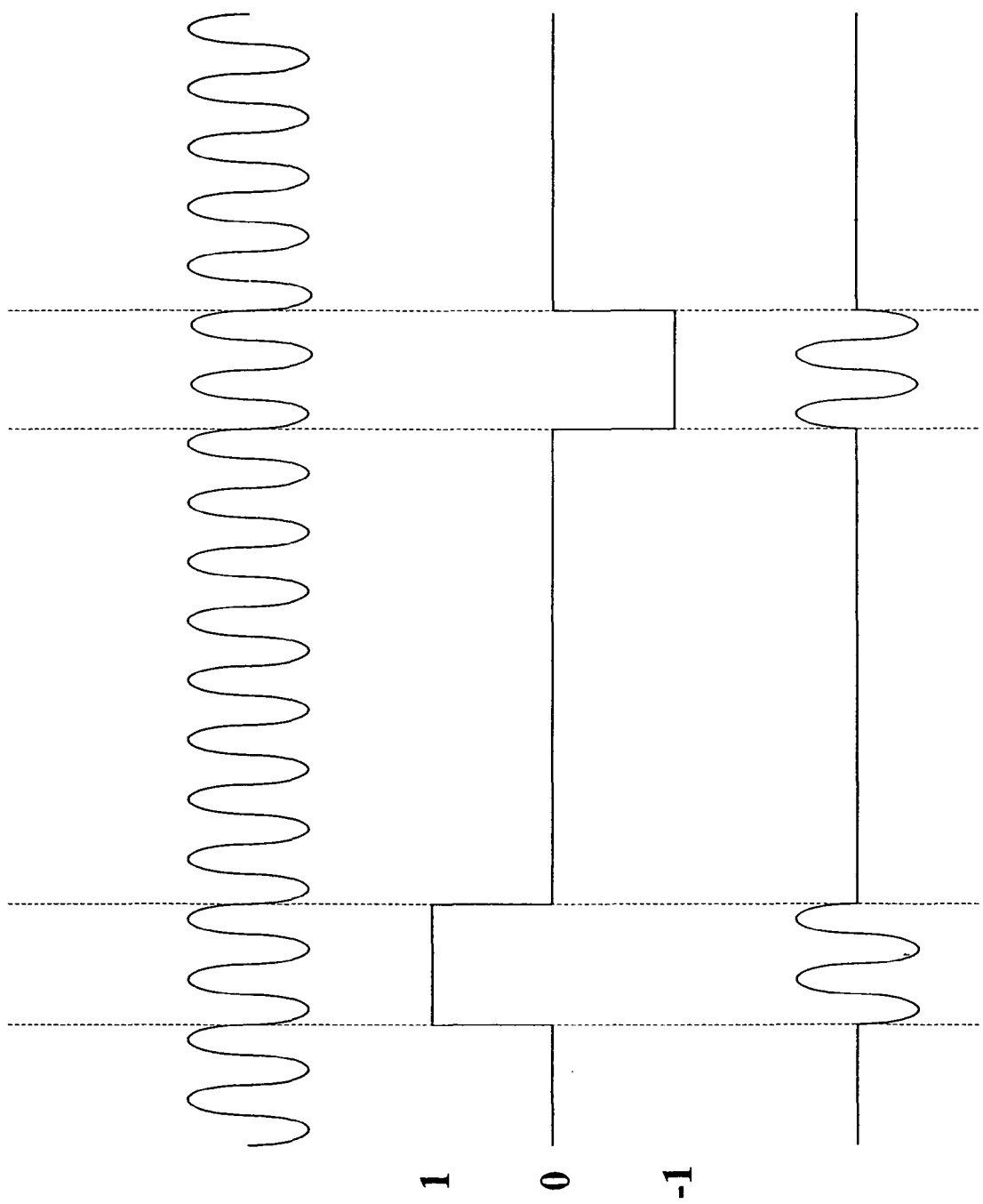
FIGS. 24A to 24C are signal graphs showing an embodiment in which bi-phase modulation is used to make a UWB signal coherent with an RF signal.

The data from the memory 2040 will tell the mixer 2045 what portions of the incoming RF signal RF will be kept to form the UWB RF signal $RF_{UWB}$. This can be used in a way that allows the signal to be created with pulse position modulation (PPM) as seen, for example, in FIGS. 23A to 23C. Alternately the signal $RF_{UWB}$ could be created as a bi-phase UWB signal as shown in FIGS. 24A to 24C. Finally, the signal could be encoded using chirping by modifying the mixer 2045 accordingly.

The UWB RF signal $RF_{UWB}$ is then sent from the mixer 2045 to the UWB circuitry 2005 where it is used for general UWB operation. However, since it was derived from the signal frequency $f_0$ of the RF signal received by the RF circuitry 1910, the UWB RF signal $RF_{UWB}$ will be coherent with the incoming RF signal RF.

Figure 21:
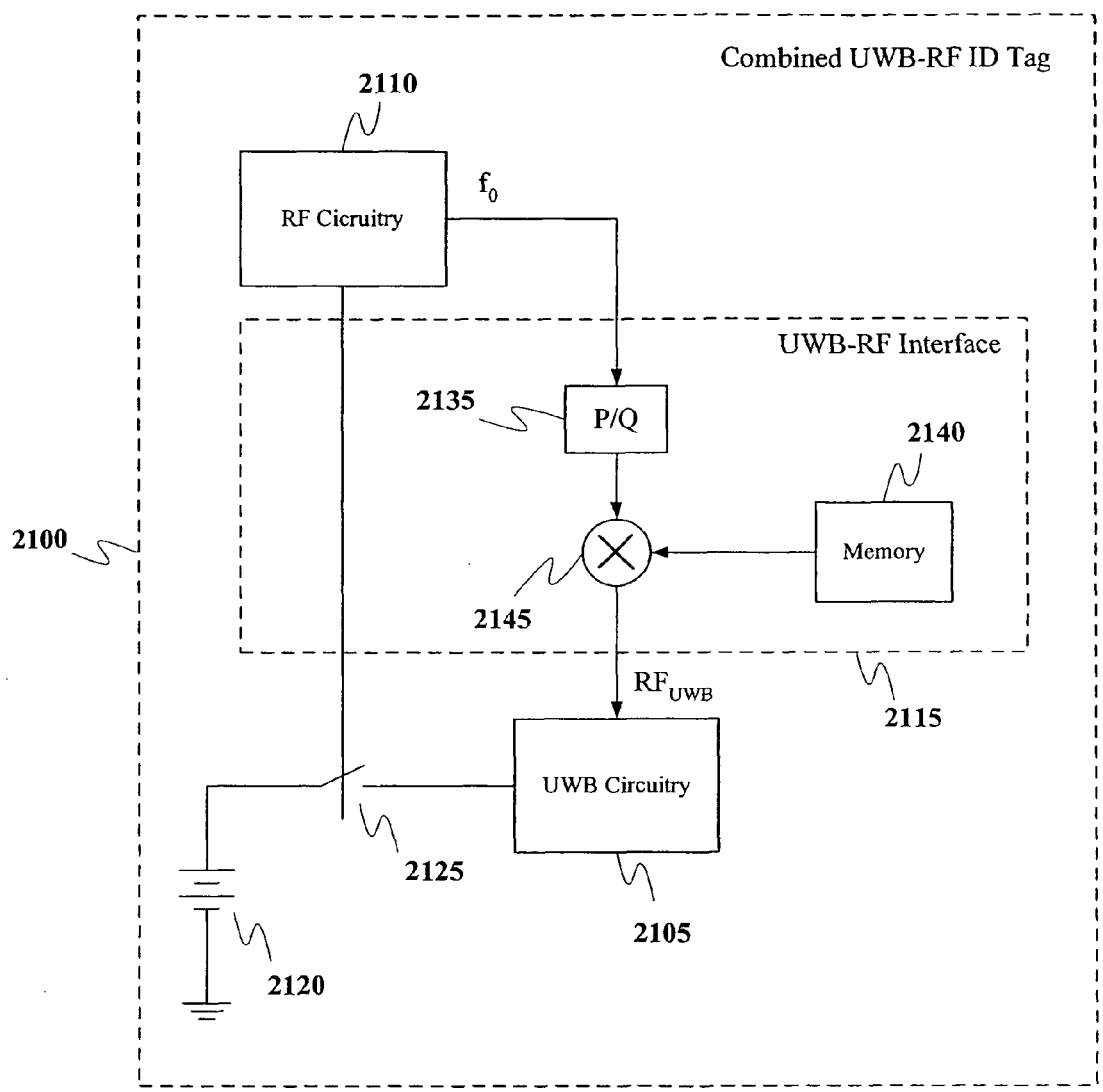
FIG. 21 is a block diagram showing a combined UWB-RF tag according to a fifth preferred embodiment.

FIG. 21 shows a combined UWB-RF tag according to a fifth preferred embodiment of the present invention. As shown in FIG. 21, the UWB-RF tag 2100 includes UWB circuitry 2105, RF circuitry 2110, a UWB-RF interface 2115, a power supply 2120, and a switch 2125 connected between the UWB circuitry 2105 and the power supply 2120. The UWB-RF interface 2115 further includes a second frequency scaler 2135, a memory 2140, and a mixer 2145. The main UWB circuitry 2130 is preferably of the sort described above with respect to FIGS. 14 to 16, while the RF circuitry 2110 is preferably of a kind generally known.

The operation of the UWB-RF tag 2100 of FIG. 21 is the same as the UWB-RF tag 1800 of FIG. 18 combined with the UWB-RF tag 2000 of FIG. 20. In this embodiment elements whose last two digits correspond to elements from FIGS. 18 and 20 perform functions similar to those in the second and fourth preferred embodiments.

The tag 2100 uses the RF circuitry 2110 to both control the supply of power to the UWB circuitry 2105 and to provide the frequency signal $f_0$ to allow the UWB-RF interface 2115 to create the UWB RF signal $RF_{UWB}$.

Figure 22:
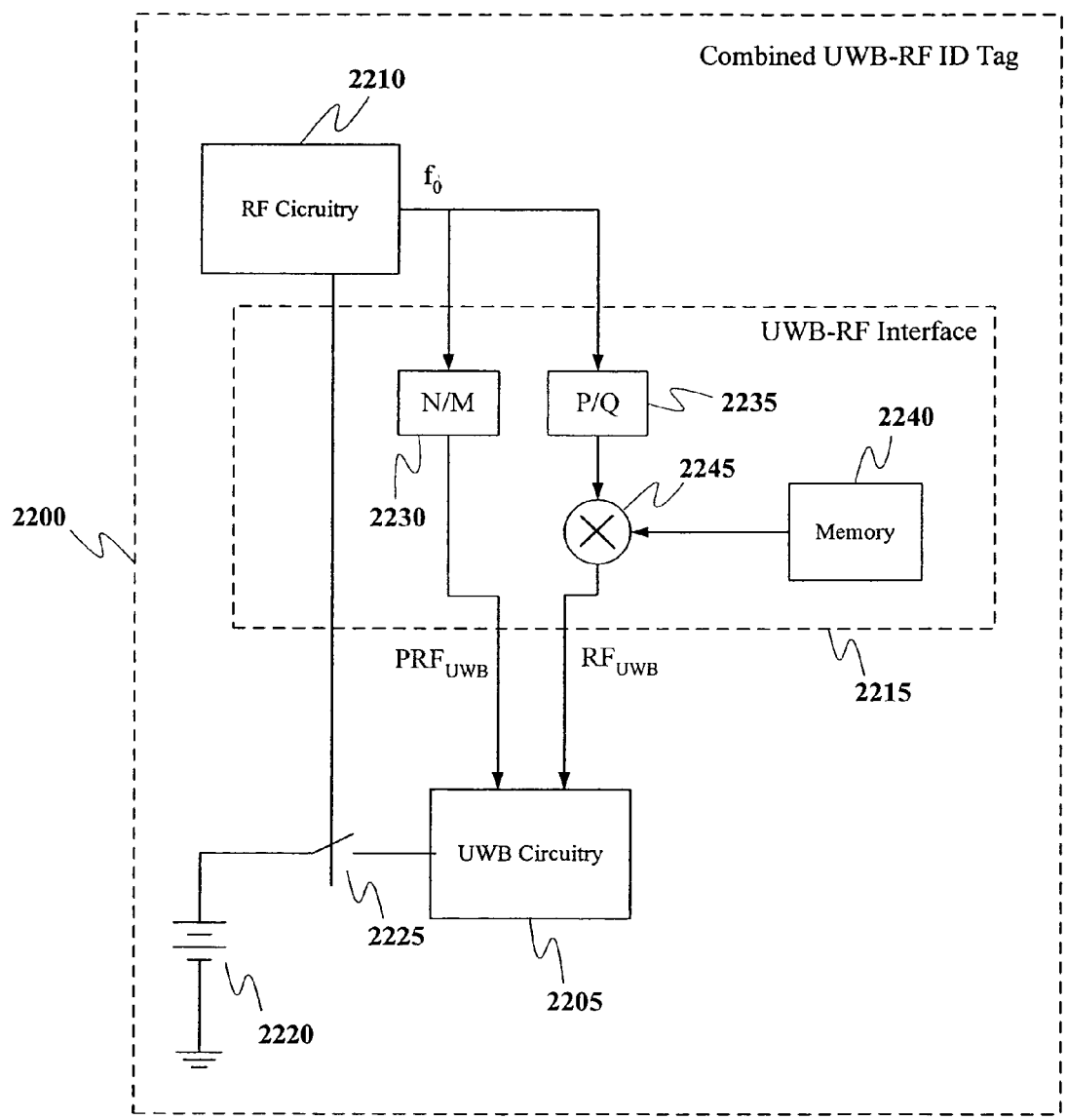
FIG. 22 is a block diagram showing a combined UWB-RF tag according to a sixth preferred embodiment.

FIG. 22 shows a combined UWB-RF tag according to a sixth preferred embodiment of the present invention. As shown in FIG. 22, the UWB-RF tag 2200 includes UWB circuitry 2205, RF circuitry 2210, a UWB-RF interface 2215, a power supply 2220, and a switch 2225 connected between the UWB circuitry 2205 and the power supply 2220. The UWB-RF interface 2215 further includes a first frequency scaler 2230, a second frequency scaler 2235, a memory 2240, and a mixer 2245. The main UWB circuitry 2230 is preferably of the sort described above with respect to FIGS. 14 to 16, while the RF circuitry 2210 is preferably of a kind generally known.

The operation of the UWB-RF tag 2200 of FIG. 22 is the same as the UWB-RF tag 1900 of FIG. 19 combined with the UWB-RF tag 2000 of FIG. 20. The tag 2200 uses the RF circuitry 2210 to both control the supply of power to the UWB circuitry 2205 and to provide the frequency signal $f_0$ to allow the UWB-RF interface 2215 to create both the UWB pulse reference frequency $PRF_{UWB}$ and the UWB RF signal $RF_{UWB}$.

In this embodiment elements whose last two digits correspond to elements from FIGS. 19 and 20 perform functions similar to those in the third and fourth preferred embodiments.

FIGS. 23A to 24C show two embodiments of how a UWB RF signal $RF_{UWB}$ can be generated to be coherent with the incoming RF signal RF. FIGS. 23A to 23C show an embodiment in which pulse position modulation (PPM) is used. FIGS. 24A to 24C show an embodiment in which bi-phase modulated signals are used.

FIG. 23A shows the RF signal RF received by the RF circuitry 2110, 2210 and passed on to the UWB-RF interface 2115, 2215. The RF signal RF is preferably a periodic signal operating at a given frequency $f_0$.

FIG. 23B shows the data signal from the memory 2140, 2240 inside of the UWB-RF interface 2115, 2215. The data signal is preferably a stream of 1's and 0's that will operate in the mixer 2145, 2245 to either pass the RF signal RF or cancel it out. Most particularly the data signal can be considered a stream of pulses with a value of "1" separated from each other by set distances, during which the value of the signal is "0." One distance Δt is shown in FIG. 23B

FIG. 23C shows the UWB RF signal $RF_{UWB}$ output from the mixer 2145, 2245. As shown in FIG. 23C, when the data signal of FIG. 23B is "1" the mixer 2145, 2245 passes the RF signal RF unchanged to the UWB RF signal $RF_{UWB}$. When the data signal is "0" the mixer 2145, 2245 cancels the RF signal RF, allowing the UWB RF signal $RF_{UWB}$ to pass as a ground or reference voltage.

In the embodiment shown in FIGS. 23A to 23C, the distance Δt between pulses in the data signal can be varied to encode information into the UWB RF signal $RF_{UWB}$. In other words, the UWB RF signal $RF_{UWB}$ is encoded using PPM.

FIG. 24A shows the RF signal RF received by the RF circuitry 2110, 2210 and passed on to the UWB-RF interface 2115, 2215. The RF signal RF is preferably a periodic signal operating at a given frequency $f_0$.

FIG. 24B shows the data signal from the memory 2140, 2240 inside of the UWB-RF interface 2115, 2215. The data signal is preferably a stream of pulses as a set distance from each other with values "1" and "−1," with the area between the pulses being at a value of "0," that will operate in the mixer 2145, 2245 to pass the RF signal RF unchanged, invert the RF signal RF and pass the inverted signal, or cancel it out.

FIG. 24C shows the UWB RF signal $RF_{UWB}$ output from the mixer 2145, 2245. As shown in FIG. 24C, when the data signal of FIG. 24B is "1" the mixer 2145, 2245 passes the RF signal RF unchanged to the UWB RF signal $RF_{UWB}$. When the data signal is "−1" the mixer 2145, 2245 passes the RF signal RF inverted to the UWB RF signal $RF_{UWB}$. When the data signal is "0" the mixer 2145, 2245 cancels the RF signal RF, allowing the UWB RF signal $RF_{UWB}$ to pass as a ground or reference voltage.

In the embodiment shown in FIGS. 24A to 24C, the polarity of the pulses of the data signal can be varied to encode information into the UWB RF signal $RF_{UWB}$. In other words, the UWB RF signal $RF_{UWB}$ is encoded using bi-phase modualtion.

In alternate embodiments other methods of encoding data into the UWB RF signal $RF_{UWB}$ can be used. For example, each wavelet may be configured to communicate q bits, where $M \geq 2^q$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, ..., +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), ..., exp(+jπ(N−1)/N), exp(−jπ(N−1)/N)), (v) multilevel multi-phase signals ($a_i$ exp(j2πβ/N)|$a_i \in \{1, a1, a2, ..., aK\}$, $\beta \in \{0, 1, ..., N−1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, ..., M\}$, and (ix) any combination of the above waveforms, such as multi-phase channel symbols transmitted according to a chirping signaling scheme. In the case of chirping, this function may be performed in the UWB-RF interface 2115, 2215, more preferably at the mixer 2145, 2245.

The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Obviously, numerous modifications and variations of the present invention are possible in light of the above teachings. For example, any one of the above described processes for enabling device functions and communications may be modified by use of signal strength information provided in any known manner. It is also understood that the present invention should not be limited to ID tags, but could be used for other communications devices as well, e.g., PDAs, stationary information kiosks, etc. It is therefore to be understood that within the scope of the appended claims, the invention may be practiced otherwise than as specifically described herein.

I claim:

1. A method for enabling a device function at a local device based on distance information, comprising:
   establishing a communication link with a remote device over a UWB medium using a multiple access protocol;
   determining a distance between the local device and the remote device; and
   controlling a device function for the remote device based on the determined distance,
   wherein the operation of controlling the device function enables the device function when the determined distance is below a set distance threshold, and
   wherein the operation of controlling the device function disables the device function when the determined distance is above the set distance threshold.

2. The method of claim 1, further comprising, displaying a positional map of the remote device with respect to the local device.

3. The method of claim 1, wherein the function is a communication connection between the local device and the remote device.

4. The method of claim 1, wherein the function is authentication of the remote device.

5. The method of claim 1, further comprising:
   updating the distance between the local device and the remote device, after enabling the device function; and
   updating the device function for the remote device based on the updated distance,
   wherein the operation of updating the device function enables the device function the determined distance is below a set distance threshold, and
   wherein the operation of updating the device function disables the device function the determined distance is below a set distance threshold.

6. The method of claim 5, wherein the operations of updating the distance and updating the device function are repeated multiple times.

7. The method of claim 1, wherein the operation of determining a distance between the local device and the remote device further comprises:
   transmitting a distance-determining message to the remote device over the communications link;
   marking a transmission time for the distance-determining message;
   receiving a response to the distance-determining message;
   marking a reception time for the response;
   determining a round trip air time for sending the distance-determining message and receiving the reply, the round trip air time representing actual time the distance-determining message and the reply spent in transit;
   computing the distance based on the round trip air time.

8. The method of claim 7, wherein the operation of determining the round trip time further comprises:
    determining processing delay in the remote device;
    determining a total transit time for sending the distance-determining message and receiving the reply, the total time representing a time between the transmission time and the reception time; and
    determining the round trip air time by subtracting the processing delay from the total transit time.

9. A method for enabling device functions at a local device based on distance information in an ultra wide band (UWB) network, comprising:
    establishing a plurality of communication links with a plurality of remote devices, respectively, over the UWB network using a multiple access protocol;
    determining a plurality of distances between the local device and each of the plurality of remote devices, respectively; and
    controlling a device function for the plurality of remote devices based on a corresponding determined distance,
    wherein the operation of controlling the device function for the plurality of remote devices enables the device function for a corresponding one of the plurality of remote devices when the corresponding determined distance is below a set distance threshold, and
    wherein the operation of controlling the device function for the plurality of remote devices disables the device function for the corresponding one of the plurality of remote devices when the corresponding determined distance is above the set distance threshold.

10. The method of claim 9, further comprising, displaying a positional map of the plurality of remote devices with respect to the local device.

11. The method of claim 9, wherein the function is a communication connection between the local device and the at least one of the plurality of remote devices.

12. The method of claim 11, further comprising:
    determining a number of the plurality of remote devices having an enabled communication connection;
    determining whether the number of the plurality of remote devices having an enabled communication connection is greater than a device threshold; and
    stopping the enabling of communication connections if the number of the plurality of remote devices having an enabled communication connection is greater than the device threshold.

13. The method of claim 9, wherein the function is authentication of the at least one of the plurality of remote devices.

14. The method of claim 9, further comprising:
    updating the plurality of distances between the local device and the plurality of remote devices, respectively, after controlling the device functions; and
    updating the device functions for the plurality of remote device based on the updated distances, respectively,
    wherein the operation of updating the device function for the plurality of remote devices enables the device function for the corresponding one of the plurality of remote devices when the determined distance is below a set distance threshold, and
    wherein the operation of updating the device function disables the device function for the corresponding one of the plurality of remote devices when the determined distance is above the set distance threshold.

15. The method of claim 13, wherein the operations of updating the plurality of distances and updating the device functions are repeated multiple times.

16. The method of claim 9, wherein the operation of determining the plurality of distances between the local device and the plurality of remote device further comprises:
    transmitting a plurality of distance-determining messages to the plurality of remote devices, respectively, over the communications link;
    marking a plurality of transmission times for the plurality of distance-determining messages, respectively;
    receiving a plurality of response to the plurality of distance-determining messages respectively;
    marking a plurality of reception times for the plurality of responses;
    determining a plurality of round trip air times for sending the plurality of distance-determining messages, and receiving the plurality of replies, respectively, the plurality of round trip air times each representing actual times the plurality of distance-determining messages and the plurality of replies spent in transit;
    computing the plurality of distances based on the plurality of round trip air time.

17. The method of claim 15, wherein the operation of determining the plurality of round trip times further comprises:
    determining a plurality of processing delays in the plurality of remote devices, respectively;
    determining a plurality of total transit times for sending the plurality of distance-determining messages and receiving the plurality of replies, respectively, the plurality of total times each representing times between the plurality of transmission times and the plurality of reception times, respectively; and
    determining the plurality of round trip air times by subtracting the plurality of processing delays from the plurality of total transit times, respectively.

* * * * *